US010552400B2

(12) United States Patent
Burger et al.

(10) Patent No.: US 10,552,400 B2
(45) Date of Patent: *Feb. 4, 2020

(54) MANAGEMENT OF INTELLIGENT DATA ASSIGNMENTS FOR DATABASE SYSTEMS WITH MULTIPLE PROCESSING UNITS

(71) Applicant: Teradata US, Inc., Dayton, OH (US)

(72) Inventors: Louis Martin Burger, Escondido, CA (US); Frederick S. Kaufmann, Irvine, CA (US)

(73) Assignee: Teradata US, Inc., San Diego, CA (US)

( * ) Notice: Subject to any disclaimer, the term of this patent is extended or adjusted under 35 U.S.C. 154(b) by 329 days.

This patent is subject to a terminal disclaimer.

(21) Appl. No.: 15/391,394

(22) Filed: Dec. 27, 2016

(65) Prior Publication Data

US 2017/0177642 A1    Jun. 22, 2017

Related U.S. Application Data

(63) Continuation-in-part of application No. 14/696,711, filed on Apr. 27, 2015.

(60) Provisional application No. 62/272,606, filed on Dec. 29, 2015, provisional application No. 62/272,639, filed on Dec. 29, 2015, provisional application No. 62/272,647, filed on Dec. 29, 2015, provisional application No. 62/272,658, filed on Dec. 29, 2015, provisional application No. 62/088,862, filed on Dec. 8, 2014.

(51) Int. Cl.
*G06F 17/30* (2006.01)
*G06F 16/22* (2019.01)
*G06F 16/2453* (2019.01)

(52) U.S. Cl.
CPC .... *G06F 16/2282* (2019.01); *G06F 16/24542* (2019.01)

(58) Field of Classification Search
USPC ....................................... 707/700, 791, 713
See application file for complete search history.

(56) References Cited

U.S. PATENT DOCUMENTS

| | | | | |
|---|---|---|---|---|
| 8,543,596 B1 * | 9/2013 | Kostamaa | ............. | G06F 16/182 707/770 |
| 2006/0059157 A1 * | 3/2006 | Heusermann | ..... | G06F 17/30643 |
| 2010/0049722 A1 * | 2/2010 | Xu | ..................... | G06F 16/24544 707/764 |
| 2012/0246170 A1 * | 9/2012 | Iantorno | ............. | G06F 11/3672 707/748 |
| 2014/0075004 A1 * | 3/2014 | Van Dusen | ............. | H04L 41/04 709/223 |

* cited by examiner

*Primary Examiner* — Hung T Vy
(74) *Attorney, Agent, or Firm* — Ramin Mahboubian

(57) ABSTRACT

Data of a database (e.g., database tables) can be reassigned from a first map to a second map in a database system that uses maps to assign data for processing to multiple processing units of a database system in accordance with one or more distributions schemes. Data portions can be selected in groups and moved in the selected groups in an efficient manner. The selection and/or movement of the data portions can be automated without requiring input for users of database systems.

14 Claims, 21 Drawing Sheets

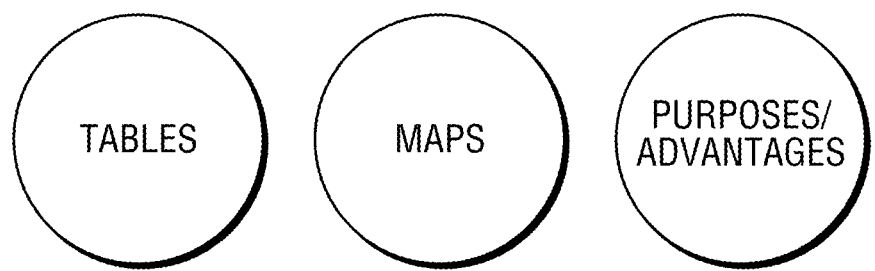
FIG. 3
FIG. 4
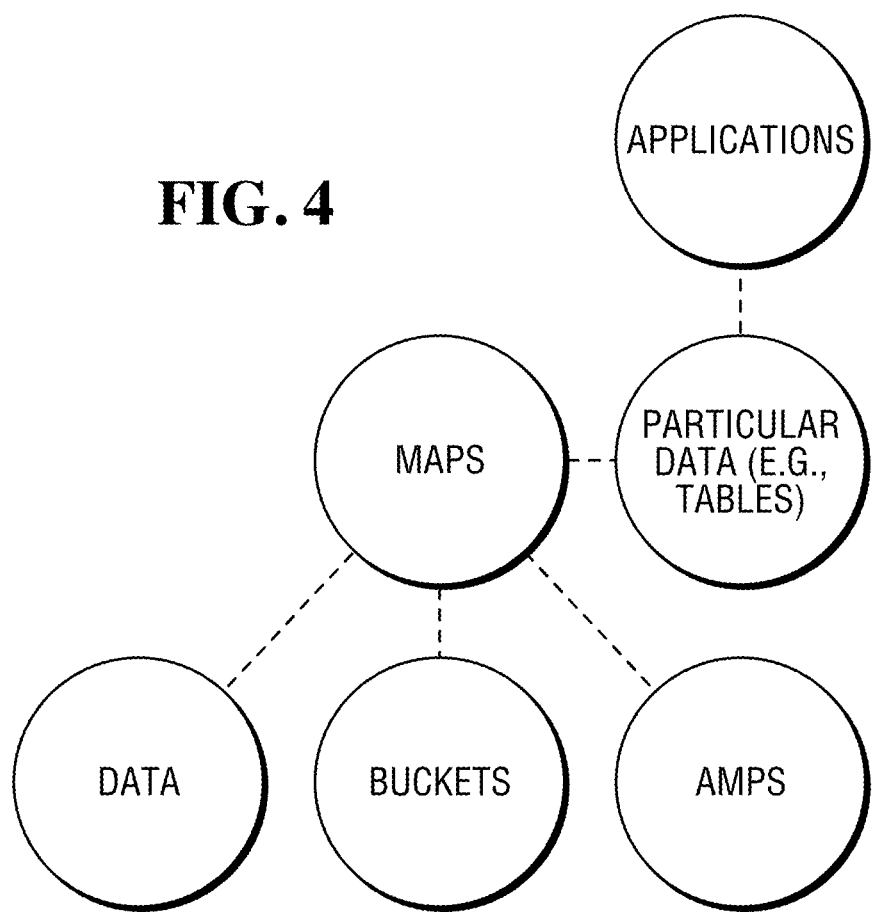

MAP 1804

D1-> C1-> P1-P1000

D2-> C2-> P1 only

D3-> C3-> P1, P3, P5 and P11

D4-> C4 (=C1)-> P1-P1000

D5-> C5-> P2, P4, P6, P8 and P10-P60

D6-> C6 (=C1)-> P1-P1000

D7-> C7 (=C1)-> P1-P1000
.
.
.
DN

MAP 1802

DN+1-> CN+1-> P1-P120

{D1, D7}

{D4, D6}
.
.
.

{D1, D4, D6, D7.....}

IMS 1800

Monitoring Data
1810

Fig. 18

```
-- Query to retrieve Step Object information from DBQL tables where
-- <:VarName> represents a caller specified SP input parameter that is
-- substituted with string replacement or as a USING parameter
INSERT INTO  VT_StepObectInfo
SELECT s1.QueryId, s1.StepLev1Num,s1.StepLev2Num, s1.StepName,
       t.Source1Id, d1.Source1Type,d1.Source2Id,d1.Source2Type,
       d1.TargetId, d1.TargetGeography
FROM [:LogDatabaseName].QryLogStepsV s1, DBC.tvm t, DBC.dbase d,
     TABLE(SYSLIB. DBQLStepObjInfo(s1.QueryId,s1.StepLev1Num.s1.StepLev2Num,
     s1.StepObjectInfo) AS d1
WHERE s1.QueryId = d1.QueryId AND  s1.StepLev1Num = d1.StepLev1Num AND
      s1.StepLev2Num = d1.StepLev2Num AND
      s1.CollectTimeStamp BETWEEN <:LogStartTime> AND <:LogEndTime> AND
      ((s1.Source1Id = t.tvmid AND t.databaseid = d.databaseid and
      d.databasename = <:DatabaseScope>) AND
      ((s2.Source1Id = t.tvmid AND t.databaseid = d.databaseid and
      d.databasename = <:DatabaseScope>) AND
```

Fig. 20A

-- Execute recursive query that generates the input source paths for each join step along with -- the target geography of each spool.
    INSERT INTO VT_join_inputs
    WITH RECURSIVE
        Join_Inputs(QueryId,StepLev1Num,StepLev2Num,Source1,Source2,
        ChildInputList,ChildBaseTableList,Leaf,Depth) AS
    (
    SELECT QueryId,StepLev1Num,StepLev2Num,Source1,Source2,
    CAST(Source1 || ' JIN ' || Source2 AS VARCHAR (10000)),
    CAST(CASE WHEN Source1Type = 'T' AND Source2Type = 'T' THEN Source1 || ',' || Source2 || ','
        WHEN Source1Type = 'T' AND Source2Type <> 'T' THEN Source1 || ','
        WHEN Source1Type <> 'T' AND Source2Type = 'T' THEN Source2 || ','
        ELSE '' END AS VARCHAR(10000)),
    CASE WHEN Source1Type = 'T' AND Source2Type = 'T' THEN 'Y' ELSE 'N' END,
    0
    FROM Vt_StepObjectInfo
    WHERE StepName = 'JIN'

UNION ALL

SELECT Results_Before.QueryId,Results_Before.StepLev1Num,Results_Before.StepLev2Num,
    ChildStep.Source1,ChildStep.Source2,
    CASE
    WHEN ChildStep.StepName = 'JIN' THEN
      Results_Before.ChildInputList || ',(' || ChildStep.TargetGeography || ')<=' ||
ChildStep.Source1 || ' JIN ' || ChildStep.Source2
      WHEN ChildStep.StepName = 'RET' THEN
      Results_Before.ChildInputList || ',(' || ChildStep.TargetGeography || ')<=' ||
'RET '|| ChildStep.Source1
      ELSE
      Results_Before.ChildInputList || ',(' || COALESCE(ChildStep.TargetGeography,'Unknown Geog')
|| ')<=' || COALESCE(ChildStep.Source1,'NullSource') || ' ' || ChildStep.StepName || ' ' ||
COALESCE(ChildStep.Source2,'NullSource')
      END,

Fig. 20B (sheet 1)

```
CASE
WHEN ChildStep.Source1Type = 'T' AND ChildStep.Source2Type = 'T' THEN
        Results_Before.ChildBaseTableList || ChildStep.Source1 || ',' || ChildStep.Source2 || ','
WHEN ChildStep.Source1Type = 'T'  THEN
 Results_Before.ChildBaseTableList || ChildStep.Source1 || ','
WHEN ChildStep.Source2Type = 'T' THEN Results_Before.ChildBaseTableList || ChildStep.Source2 || ','
ELSE
 Results_Before.ChildBaseTableList
END, CASE
WHEN (ChildStep.Source1Type = 'T' OR ChildStep.Source1Type IS NULL) AND
(ChildStep.Source2Type = 'T' OR ChildStep.Source2Type IS NULL)
THEN 'Y' ELSE 'N' END,
 Results_Before.Depth + 1

FROM Join_Inputs Results_Before INNER JOIN VT_StepObjectInfo ChildStep ON
 (Results_Before.Source1 = ChildStep.Target OR Results_Before.Source2 = ChildStep.Target)
 AND Results_Before.QueryId = ChildStep.QueryId )
SELECT QueryId,StepLev1Num,StepLev2Num,ChildInputList,ChildBaseTableList,Leaf,Depth
FROM Join_Inputs;
```

Fig. 20B  (sheet 2)

```
-- Group together all leaf paths for each join step and look for any inputs that had a non-local geography.
-- In addition, form the set of all base tables that are within the input source paths.
-- Notes: Need to remove duplicates within result column 'InputBaseTables'
INSERT INTO VT_inplace_join_tables
SELECT QueryId,CAST(CAST(StepLev1Num AS INTEGER) AS VARCHAR(4)) || '.' ||
CAST(CAST(StepLev2Num AS INTEGER)
        AS VARCHAR(4)) AS StepNum,
    COUNT(CASE WHEN ChildInputList LIKE '%(D)%' OR  ChildInputList LIKE '%(H)%' OR
        ChildInputList LIKE '%(S)%' THEN 1 ELSE NULL END) AS NumNonLocalInputs,
    CASE WHEN NumNonLocalInputs > 0 THEN 'Non-Inplace Join Step' ELSE 'Inplace Join Step' END
      AS TypeOfJoin,
    TDStats.UDFConcat(ChildBaseTableList) AS InputBaseTables
FROM VT_join_inputs
WHERE Leaf = 'Y'
GROUP BY 1,2
ORDER BY 1,2;
```

Fig. 20C

VT_StepObjectInfo

| QueryId | Step Lev1 | Step Lev2 | Step Name | Src1 Name | Src1 Type | Src2 Name | Src2 Type | Target | Target Geog |
|---|---|---|---|---|---|---|---|---|---|
| 100 | 1 | 1 | RET | T1 | T | ? | ? | Spool_1 | L |
| 100 | 1 | 2 | RET | T2 | T | ? | ? | Spool_2 | L |
| 100 | 2 | 0 | JIN | Spool_1 | S | Spool_2 | S | Spool_3 | L |
| 100 | 3 | 0 | JIN | T3 | T | T4 | T | Spool_4 | L |
| 100 | 4 | 0 | JIN | Spool_3 | S | Spool_4 | S | Spool_5 | L |
| 100 | 5 | 0 | JIN | Spool_5 | S | T5 | T | Spool_6 | R |
| 200 | 1 | 1 | RET | T1 | T | ? | ? | Spool_1 | L |
| 200 | 1 | 2 | RET | T2 | T | ? | ? | Spool_2 | L |
| 200 | 2 | 0 | JIN | Spool_1 | S | Spool_2 | S | Spool_3 | H |
| 200 | 3 | 0 | JIN | T3 | T | T4 | T | Spool_4 | L |
| 200 | 4 | 0 | JIN | Spool_3 | S | Spool_4 | S | Spool_5 | L |
| 200 | 5 | 0 | JIN | Spool_5 | S | T5 | T | Spool_6 | R |

Fig. 20D

VT_join_inputs

| QueryId | Lev1 | Lev2 | Depth | Leaf | ChildInputList | ChildBaseTableList |
|---|---|---|---|---|---|---|
| 100 | 2 | 0 | 0 | N | Spool_1 JIN Spool_2 | |
| 100 | 2 | 0 | 1 | Y | Spool_1 JIN Spool_2,(L)<=RET T1 | T1, |
| 100 | 2 | 0 | 1 | Y | Spool_1 JIN Spool_2,(L)<=RET T2 | T2, |
| 100 | 3 | 0 | 0 | Y | T3 JIN T4 | T3,T4, |
| 100 | 4 | 0 | 0 | N | Spool_3 JIN Spool_4 | |
| 100 | 4 | 0 | 1 | Y | Spool_3 JIN Spool_4,(L)<=T3 JIN T4 | T3,T4, |
| 100 | 4 | 0 | 1 | N | Spool_3 JIN Spool_4,(L)<=Spool_1 JIN Spool_2 | |
| 100 | 4 | 0 | 2 | Y | Spool_3 JIN Spool_4,(L)<=Spool_1 JIN Spool_2,(L)<=RET T2 | T2, |
| 100 | 4 | 0 | 2 | Y | Spool_3 JIN Spool_4,(L)<=Spool_1 JIN Spool_2,(L)<=RET T1 | T1, |
| 100 | 5 | 0 | 0 | N | Spool_5 JIN T5 | T5, |
| 100 | 5 | 0 | 1 | N | Spool_5 JIN T5,(L)<=Spool_3 JIN Spool_4 | T5, |
| 100 | 5 | 0 | 2 | Y | Spool_5 JIN T5,(L)<=Spool_3 JIN Spool_4,(L)<=T3 JIN T4 | T5,T3,T4, |
| 100 | 5 | 0 | 2 | N | Spool_5 JIN T5,(L)<=Spool_3 JIN Spool_4,(L)<=Spool_1 JIN Spool_2 | T5, |
| 100 | 5 | 0 | 3 | Y | Spool_5 JIN T5,(L)<=Spool_3 JIN Spool_4,(L)<=Spool_1 JIN Spool_2,(L)<=RET T2 | T5,T2, |
| 100 | 5 | 0 | 3 | Y | Spool_5 JIN T5,(L)<=Spool_3 JIN Spool_4,(L)<=Spool_1 JIN Spool_2,(L)<=RET T1 | T5,T1, |
| 200 | 2 | 0 | 0 | N | Spool_1 JIN Spool_2 | |
| 200 | 2 | 0 | 1 | Y | Spool_1 JIN Spool_2,(L)<=RET T1 | T1, |
| 200 | 2 | 0 | 1 | Y | Spool_1 JIN Spool_2,(L)<=RET T2 | T2, |
| 200 | 3 | 0 | 0 | Y | T3 JIN T4 | T3,T4, |
| 200 | 4 | 0 | 0 | N | Spool_3 JIN Spool_4 | |
| 200 | 4 | 0 | 1 | Y | Spool_3 JIN Spool_4,(L)<=T3 JIN T4 | T3,T4, |
| 200 | 4 | 0 | 1 | N | Spool_3 JIN Spool_4,(H)<=Spool_1 JIN Spool_2 | |
| 200 | 4 | 0 | 2 | Y | Spool_3 JIN Spool_4,(H)<=Spool_1 JIN Spool_2,(L)<=RET T2 | T2, |
| 200 | 4 | 0 | 2 | Y | Spool_3 JIN Spool_4,(H)<=Spool_1 JIN Spool_2,(L)<=RET T1 | T1, |
| 200 | 5 | 0 | 0 | N | Spool_5 JIN T5 | T5, |
| 200 | 5 | 0 | 1 | N | Spool_5 JIN T5,(L)<=Spool_3 JIN Spool_4 | T5, |
| 200 | 5 | 0 | 2 | Y | Spool_5 JIN T5,(L)<=Spool_3 JIN Spool_4,(L)<=T3 JIN T4 | T5,T3,T4, |
| 200 | 5 | 0 | 2 | N | Spool_5 JIN T5,(L)<=Spool_3 JIN Spool_4,(H)<=Spool_1 JIN Spool_2 | T5, |
| 200 | 5 | 0 | 3 | Y | Spool_5 JIN T5,(L)<=Spool_3 JIN Spool_4,(H)<=Spool_1 JIN Spool_2,(L)<=RET T2 | T5,T2, |
| 200 | 5 | 0 | 3 | Y | Spool_5 JIN T5,(L)<=Spool_3 JIN Spool_4,(H)<=Spool_1 JIN Spool_2,(L)<=RET T1 | T5,T1, |

Fig. 20E

VT_inplace_join_tables

| QueryId | StepNum | NumNonLocalInputs | TypeOfJoin | InputBaseTables (with possible duplicates) |
|---|---|---|---|---|
| 100. | 2.0 | 0 | Inplace Join Step | "T1,","T2," |
| 100. | 3.0 | 0 | Inplace Join Step | "T3,T4," |
| 100. | 4.0 | 0 | Inplace Join Step | "T1,","T2,","T3,T4," |
| 100. | 5.0 | 0 | Inplace Join Step | "T5,T3,T4,","T5,T1,","T5,T2," |
| 200. | 2.0 | 0 | Inplace Join Step | "T1,","T2," |
| 200. | 3.0 | 0 | Inplace Join Step | "T3,T4," |
| 200. | 4.0 | 2 | Non-Inplace Join Step | "T1,","T2,","T3,T4," |
| 200. | 5.0 | 2 | Non-Inplace Join Step | "T5,T3,T4,","T5,T1,","T5,T2," |

Fig. 20F

Candidate Query-based Groups

| Candidate Table Group | Inplace Join Frequency | Join Step Avg. Cost | Weighted Formula | Group Rank |
|---|---|---|---|---|
| {T1,T2} | 1000 | 300 secs | 1300 | 1 |
| {T3,T4} | 800 | 400 secs | 1200 | 2 |
| {T1,T3,T4} | 500 | 600 secs | 1100 | 3 |
| {T2,T6,T7,T8} | 100 | 900 secs | 1000 | 4 |
| {T1,T8} | 200 | 400 secs | 600 | 5 |
| {T9} | 0 | 0 | 0 | 6 |

Fig. 20G

Groups after Removing Duplicates

| Candidate Table Group | Inplace Join Frequency | Join Step Avg. Cost | Weighted Formula | Group Rank |
|---|---|---|---|---|
| {T1,T2} | | | | 1 |
| {T3,T4} | | | | 2 |
| {empty} | | | | - |
| {T6,T7,T8} | | | | 4 |
| {emtpy} | | | | - |
| {T9} | | | | 6 |

Fig. 20H

MANAGEMENT OF INTELLIGENT DATA ASSIGNMENTS FOR DATABASE SYSTEMS WITH MULTIPLE PROCESSING UNITS

CROSS REFERENCE TO THE RELATED APPLICATIONS

This application take priority form the Provisional U.S. Patent Application No. 62/272,606, entitled: "AUTOMATED MANAGMENT OF INTELLEGENT DATA ASSIGNMENT FOR DATABASE SYSTEMS," by Louis Martin Burger et al., filed on Dec. 29, 2015, which is hereby incorporated herein by references for all purposes.

This application also take priority form the Provisional U.S. Patent Application No. 62/272,639, entitled: "MANAGMENT OF SPARSE DATA FOR INTELLEGENT DATA ASSIGNMENT FOR DATABASE SYSTEMS," by Frederick S. Kaufman et al., also filed on Dec. 29, 2015, which is also hereby incorporated herein by references for all purposes.

This application also take priority form the Provisional U.S. Patent Application No. 62/272,647, entitled: "ASSIGNMENT OF DATA FOR INTELLEGENT DATA PROCESSING IN DATABASE SYSTEMS," by Frederick S. Kaufman, also filed on Dec. 29, 2015, which is also hereby incorporated herein by references for all purposes.

This application also take priority form the Provisional U.S. Patent Application No. 62/272,658, entitled: "MOVER TIME LIMIT FOR INTELLEGENT DATA PROCESSING IN DATABASE SYSTEMS," by Donald Raymond Pederson, also filed on Dec. 29, 2015, which is also hereby incorporated herein by references for all purposes.

This application is also a Continuation In Part (CIP) of, and take priority from, the U.S. patent application Ser. No. 14/696,711, by John Mark Morris, filed on Apr. 27, 2015, which takes priority from the Provisional U.S. Patent Application No. 62/088,862, entitled: "MAP INTELLIGENCE FOR MAPPING DATA TO MULTIPLE PROCESSING UNITS OF DATABASE SYSTEMS," by John Mark Morris, filed on Dec. 8, 2014, both of which are hereby incorporated by references herein for all purposes.

Accordingly, this application take the earliest priority form the Provisional U.S. patent from the Provisional U.S. Patent Application No. 62/088,862, entitled: "MAP INTELLIGENCE FOR MAPPING DATA TO MULTIPLE PROCESSING UNITS OF DATABASE SYSTEMS," by John Mark Morris, filed on Dec. 8, 2014.

BACKGROUND

Data can be an abstract term. In the context of computing environments and systems, data can generally encompass all forms of information storable in a computer readable medium (e.g., memory, hard disk). Data, and in particular, one or more instances of data can also be referred to as data object(s). As is generally known in the art, a data object can, for example, be an actual instance of data, a class, a type, or a particular form of data, and so on.

Generally, one important aspect of computing and computing systems is storage of data. Today, there is an ever increasing need to manage storage of data in computing environments. Databases provide a very good example of a computing environment or system where the storage of data can be crucial. As such, to provide an example, databases are discussed below in greater detail.

The term database can also refer to a collection of data and/or data structures typically stored in a digital form. Data can be stored in a database for various reasons and to serve various entities or "users." Generally, data stored in the database can be used by one or more the "database users." A user of a database can, for example, be a person, a database administrator, a computer application designed to interact with a database, etc. A very simple database or database system can, for example, be provided on a Personal Computer (PC) by storing data (e.g., contact information) on a Hard Disk and executing a computer program that allows access to the data. The executable computer program can be referred to as a database program, or a database management program. The executable computer program can, for example, retrieve and display data (e.g., a list of names with their phone numbers) based on a request submitted by a person (e.g., show me the phone numbers of all my friends in Ohio).

Generally, database systems are much more complex than the example noted above. In addition, databases have been evolved over the years and are used in various business and organizations (e.g., banks, retail stores, governmental agencies, universities). Today, databases can be very complex. Some databases can support several users simultaneously and allow them to make very complex queries (e.g., give me the names of all customers under the age of thirty five (35) in Ohio that have bought all the items in a given list of items in the past month and also have bought a ticket for a baseball game and purchased a baseball hat in the past 10 years).

Typically, a Database Manager (DBM) or a Database Management System (DBMS) is provided for relatively large and/or complex databases. As known in the art, a DBMS can effectively manage the database or data stored in a database, and serve as an interface for the users of the database. For example, a DBMS can be provided as an executable computer program (or software) product as is also known in the art.

It should also be noted that a database can be organized in accordance with a Data Model. Some notable Data Models include a Relational Model, an Entity-relationship model, and an Object Model. The design and maintenance of a complex database can require highly specialized knowledge and skills by database application programmers, DBMS developers/programmers, database administrators (DBAs), etc. To assist in design and maintenance of a complex database, various tools can be provided, either as part of the DBMS or as free-standing (stand-alone) software products. These tools can include specialized Database languages (e.g., Data Description Languages, Data Manipulation Languages, Query Languages). Database languages can be specific to one data model or to one DBMS type. One widely supported language is Structured Query Language (SQL) developed, by in large, for Relational Model and can combine the roles of Data Description Language, Data Manipulation Language, and a Query Language.

Today, databases have become prevalent in virtually all aspects of business and personal life. Moreover, usage of various forms of databases is likely to continue to grow even more rapidly and widely across all aspects of commerce, social and personal activities. Generally, databases and DBMS that manage them can be very large and extremely complex partly in order to support an ever increasing need to store data and analyze data. Typically, larger databases are used by larger organizations, larger user communities, or device populations. Larger databases can be supported by relatively larger capacities, including computing capacity (e.g., processor and memory) to allow them to perform many tasks and/or complex tasks effectively at the same time (or in parallel). On the other hand, smaller databases systems are also available today and can be used by smaller organizations. In contrast to larger databases, smaller databases can operate with less capacity.

A current popular type of database is the relational database with a Relational Database Management System (RDBMS), which can include relational tables (also referred to as relations) made up of rows and columns (also referred to as tuples and attributes). In a relational database, each row represents an occurrence of an entity defined by a table, with an entity, for example, being a person, place, thing, or another object about which the table includes information.

One important objective of databases, and in particular a DBMS, is to optimize the performance of queries for access and manipulation of data stored in the database. Given a target environment, an "optimal" query plan can be selected as the best option by a database optimizer (or optimizer). Ideally, an optimal query plan is a plan with the lowest cost (e.g., lowest response time, lowest CPU and/or I/O processing cost, lowest network processing cost). The response time can be the amount of time it takes to complete the execution of a database operation, including a database request (e.g., a database query) in a given system. In this context, a "workload" can be a set of requests, which may include queries or utilities, such as, load that have some common characteristics, such as, for example, application, source of request, type of query, priority, response time goals, etc.

Today, database systems with multiple processing nodes can be very effective for storing and processing data. For example, in a multi-node database system, each node can be provided with one or more processing units. A processing unit in a node can be provided with one or more physical processors that each support one or more virtual processors. Each node of a multi-node database system can, for example, have its own storage for storing data of the database. Generally, data stored in a database can be assigned for storage and/or processing to a processing unit or to a node of the database system. Ideally, data should be distrusted between the nodes and/or processing units in an effective manner and database queries should be processed in a manner that would allow effective use of all of the nodes and/or processing units of the multi-node database system to extend possible or needed.

In view of the prevalence of databases, especially, those with multiple processing units, in various aspects of commerce and general life today, it is apparent that database systems with multiple processing units are very useful.

SUMMARY

Broadly speaking, the invention relates to computing environments and systems. More particularly, the invention relates to database systems.

In accordance with one aspect, distinct data portions (e.g., database tables) can be reassigned from a first map to a second map. It should be noted that first map can assign each one of the distinct data portions to one or more multiple processing units of a database system for processing in accordance with one or more distributions schemes.

In accordance with one embodiment, a computer-implemented method of reassigning data portions can select a set of the distinct data portions assigned to the first map for assignment to the second map as selected data portions, and determine at least one reassigning group for the selected data portions. A reassigning group can identify two or more of the selected data portions from the first map for reassigned together to the second map as a group.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIG. 3 depicts one or more maps provided for one or more tables in accordance with one embodiment.

FIG. 4 depicts maps that effectively assign data of a database, including tables, to buckets and AMPS for various applications in accordance with one embodiment.

FIG. 18 depicts an Intelligent Mapping System (IMS) in a database environment in accordance with another embodiment.

FIGS. 20A-H depict additional exemplary tables and exemplary scripts in accordance with one or more embodiments.

DETAILED DESCRIPTION

Figure 1A:
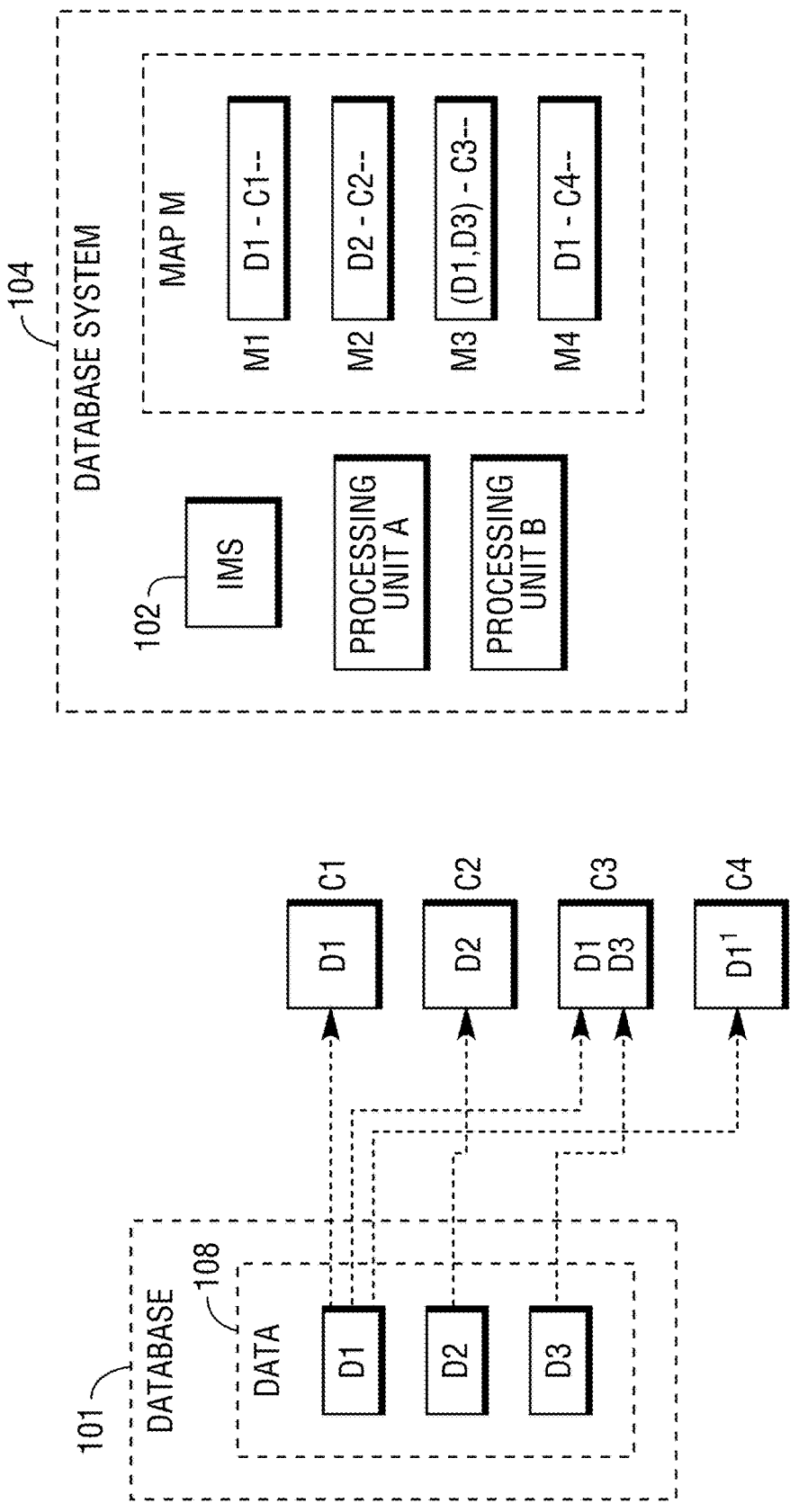
FIG. 1A depicts an Intelligent (or open or robust) Mapping System (IMS) in a database environment in accordance with one embodiment.

As noted in the background section, database systems with multiple processing units are very useful. Generally, database systems with multiple processing units need to assign data to their processing units for processing. Typically, the data being assigned is associated with database queries being processed by the database system. Ideally, data should be assigned to the processing units in an efficient manner to effectively allow them to work together at the same time to extent possible or needed.

Conventionally, data can be assigned to the processing units of a database system by using a hashing technique, as generally known in the art. However, hashing may not be an ideal solution for every situation. Generally, different assignments strategies may be more effective as one strategy may work better than the other in a given situation. For example, an assignment strategy used for larger tables may not be ideal for smaller tables, or vice versa. As such, there is a need for improved techniques for assignment of data for processing by the processing units of database systems with multiple processing units.

It will be appreciated that data can be assigned to processing units of a database system with multiple processing in accordance with one aspect. The assignment of data to the processing units can be referred to herein as mapping data. As such, a data map (or a map) can be used for assigning data to processing units of a database system with multiple processing in accordance with one embodiment. In other words, maps (or other suitable mechanism or effectively assigning data) can be provided as a more effective solution for assigning data to the processing units of database systems that can operate with multiple processing units. Generally, a map can be used to assign data to the processing units for processing, virtually in any desired manner (e.g., virtually any desired function). By way of example, maps can associate data to containers (e.g., buckets) and associate the containers to processing units of database system with multiple processing units in accordance with one embodiment.

In accordance with another aspect, multiple assignments (e.g., multiple maps) can be provided for assignment of the same data. In accordance with yet another aspect, multiple assignment (e.g., multiple maps) can have various states (e.g., active, inactive). It will also be appreciated that the (data assignments) (e.g., maps can be used to provide additional benefits, including, for example, fault resiliency, query optimization, elasticity. Also, it will be appreciated that data assignments (e.g., maps) can better facilitate implementation of desired application and/or environments, including, for example, software only and Cloud, Commodity, and Open Environments, as well as, Open, Purpose-Built, or Multi-Platforms.

Embodiments of these aspects of the invention are also discussed below with reference to FIGS. 1-20H. However, those skilled in the art will readily appreciate that the detailed description given herein with respect to these figures is for explanatory purposes as the invention extends beyond these limited embodiments.

FIG. 1A depicts an Intelligent (or open or robust) Mapping System (IMS) 102 in a database environment 100 in accordance with one embodiment. Generally, the IMS 102 can be associated with a database 101 configured to store data 108, for example, in various storage devices, including, volatile (e.g., memory) and non-volatile storage devices (e.g., HDD's, SSD) (not shown). Referring to FIG. 1A, the IMS 102 can, for example, be provided as a part (or a component) of a database system (e.g., a database management system) 104 that may include and/or be operatively connected to a plurality of processing units (A and B). Those skilled in the art will readily know that each one the processing units A and B can, for example, include one or more physical processors (e.g., CPUs). The processing units (or processing modules) A and B, can, for example, be part of two different nodes or the same node of a multi-node database system that includes the database system 104. Also, as those skilled in the art will readily appreciate, the IMS 102 can be provided using hardware and/or software components. For example, IMS 102 can be provided, in part, or entirely, as computer executable code stored in a non-transitory computer readable storage medium (e.g., volatile or non-volatile memory) (not shown). It should be noted that the IMS 102 can also be provided as a separate component that may or may not interact with the database system 104.

In any case, it will be appreciated that IMS 102 can effectively assign (or associate) multiple distinct portions of the data 108 of the database 101 (e.g., D1, D2, D3) to one or more of the multiple processing units A and B of the database system 102 for processing. In doing so, the IMS 102 can effectively use a map (or a mapping scheme) provided as mapping data (or a map) M that associates multiple distinct portions of the data D of the database to multiple distinct data containers (or "containers") C (e.g., C1, C2, C3 and C4). The map M can also associate each one the multiple distinct containers C for processing to one or more of the multiple processing unit A and B of the database system 102. As such, the map M can, for example, be provided as input to the IMS 102. As those skilled in the art will readily appreciate, the IMS 102 may also be configured used to create, store and/or maintain the map M. As such, the map M can be provided as a part of the IMS 102. Generally, the map M can be stored in a non-volatile or volatile storage. Typically, it would be more useful to store Map M in non-volatile storage so that the mapping information can be preserved. The map M can, for example, be provided at least in part by a human (e.g., database administrator). As such, the IMS 102 may also be configured to interface or interact with a user (e.g., a human, a database administrator, an application program) in order to create and/or maintain the map M.

Referring to FIG. 1A, map (or mapping data) M can be represented by multiple individual mappings (or maps) M1, M2, M3 and M4, such that each one of the mappings associates or assigns one or more distinct portions of the data 108 of the database 101 (e.g., D1, D2, D3) to one or more of the multiple processing units A and B of the database system 102. In doings, the distinct portions of the data 108 can be mapped to distinct containers C that can, in turn, be mapped to the processing units A and B for processing.

It will also be appreciated that that unlike conventional techniques, the distinct portions of the data 108 of the database 101 (e.g., D1, D2, D3) need not be assigned or associated to the processing units A and B of the database system 104 for processing, using only a hashing scheme. In other words, the map M can allow virtually any type of assignment and/or association to be made between the data portions and processing units of the database system 104. For example, referring to FIG. 1A, a database table D2, in its entirety, can be mapped as data D2 to at least one container C2. As another example, a round-robin technique can be used to map multiple distinct portions of the data 108 of the database 101 to multiple distinct containers, for example, such that data portion D1 is mapped to the container C1, the data portion D2 is mapped to a container C2, and so on (shown in FIG. 1A). As yet another example, referring again to FIG. 1A, the same portion of data (D1) of the database 101 can be mapped to multiple containers (C1 and C4). In other words, copies or logical copies of the same distinct data portions (e.g., logical copies D1 and D1' of the same distinct data) can be coexist and can be effectively mapping to different containers using different maps. As an another example, data D1 and D3 can also both be mapped to the container C3, and so on. Although not shown in FIG. 1A, it should be noted that each one of the individual maps (m1, m2, m3 and m4) can also map the containers C1, C2, C3 and C4 to the processing units A and B. Alternatively, one or more of the containers C1, C2, C3 and C4 can be mapped to the processing units A and B using additional mapping information (e.g., a set of map that are separate from maps m1, m2, m3 and m4. In any case, as mapping data, map M can effectively map the data portions to the processing units virtually in any desired manner.

In view of the foregoing, it is apparent that the map M and IMS 102 can provide and use an open, robust and intelligent mapping system for the database 101 where the mapping of data to the processing units A and B of the database system 102 need not be limited to hashing schemes. As will be discussed in greater detail, the map data M and IMS 102 can provide additional significant benefits, including, for example, fault resiliency, elasticity, and optimization of queries. In addition, the map data M and IMS 102 can provide a more suitable environment, for example, for implementations of various desired environments or applications, including, for example, "Cloud," "Commodity", "Open" and "Software Only" platforms or models.

As will also be discussed in greater detail, query optimization can be done by considering maps in the map data M. Also, the maps in the map data M need not be independent on a specific platform and/or hardware. Furthermore, the IMS 102 can perform various map related operations, including, for example, creating new maps, deleting maps, growing a map, shrinking a map, merging maps, separating or dividing a map into multiple maps, activating (or bringing online) a map and deactivating (bringing offline) a map. For example, IMS can facilitate creation of new maps for new data and/or new processing units, as data becomes available for storage in the database 101 and/or as new processing units are added to the database system 102. Similarly, old maps pertaining to data no longer needed or to be deleted from the database 101 and/or old maps pertaining to processing units that are to be removed from the database system 102 can be deleted. As another example, maps can become active or inactive during a reconfiguration process in a dynamic manner allowing the database system 102 to still operate with a set of active maps.

By way of example, one or more of the containers C can be provided as one or more "buckets" (e.g., conventional buckets as generally known in the art) and the processing units (1-N) can be provided by using one or more physical processors or virtual processors, for example, as one or more virtual processors (e.g., an "Access Module Processer" (AMP)) running on one or more physical processors, such as AMPs provided in a Teradata Active Data Warehousing System as will be known to those skilled in the art. As such, a Map M can, for example, effectively associate or assign data D to buckets and also associate or assign AMP's (or AMPS) in accordance with embodiment.

Figure 1B:
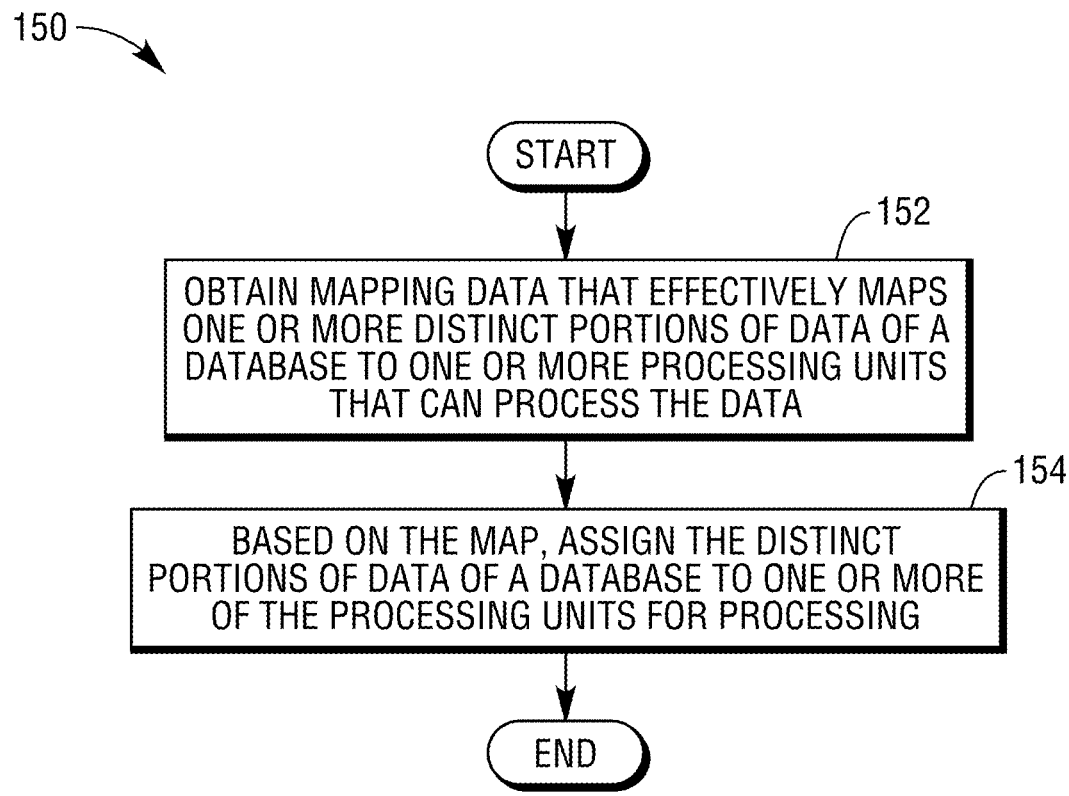
FIG. 1B depicts a method for processing data of a database by a database system that includes multiple processing units (or processing modules) in accordance with one embodiment.

FIG. 1B depicts a method 150 for processing data of a database by a database system that includes multiple processing units (or processing modules) in accordance with one embodiment. It should be noted that each one of the processing units can be configured to process at least a portion of data of the database, by using one or more physical processors. Method 150 can, for example, be performed by the IMS 101 (shown in FIG. 1A) or more generally, a database system configured for multiple processing units. Referring to FIG. 1B, initially, at least one map is obtained (e.g., stored, accessed, determined, generated) 152. The map at least associates multiple distinct portions of data of the database to multiple distinct containers. The map also associates at each one the multiple distinct containers to one or more of the multiple processing units for processing. Next, at least partially based on the map, one or more of the multiple distinct portions of the data is assigned (152) to one or more of the multiple processing units for processing.

Figure 2:
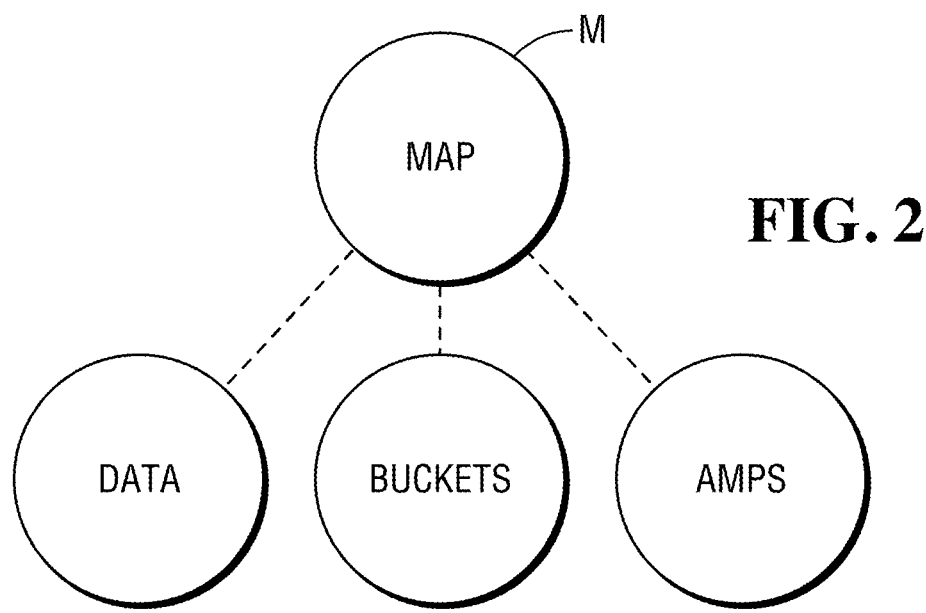
FIG. 2 depicts an exemplary MAP that associates or assigns data to buckets and AMPS in accordance with one embodiment.

To elaborate further, FIG. 2 depicts an exemplary MAP M that associates or assigns data to buckets and AMPS in accordance with one embodiment. Referring to FIG. 2, data can be assigned to buckets using various techniques, including, for example, hashing, adaptive round robin, as well as virtually any other desired function or assignment. For example, a function or assignment can be defined that associates a particular data component or type (e.g., a database table) to a bucket. Similarly, buckets can be assigned using various techniques, including, for example, hashing, adaptive round robin, as well as virtually any other desired function or assignment.

Generally, a map M (shown in FIG. 1A) can effectively assign a particular type of data or data component of databases to a container (e.g., a bucket) in various ways without virtually any limitations. One example of a particular type of data or data component that is currently prevalent in databases is a database table (or "table"). As such, tables will be used as an example to further elaborate on how a map M can be effectively used to assign data for various purposes.

FIG. 3 depicts one or more maps provided for one or more tables in accordance with one embodiment. Referring to FIG. 3, a map can be provided for one or more tables in consideration of various applications, purposes and/or advantages (e.g., optimization of database queries, fault resiliency, elasticity, "software-only" applications). One example is a map-aware optimizer that uses various maps defined for a table, or a set of tables, in order to facilitate optimization of the execution and/or processing of database queries relating to the one or more tables. Another example, would be fault resiliency, where multiple maps can, for example, allow a database query to be processed and/or executed using one or more alternative maps that effectively provide one or more alternative paths for processing and/or execution of the database quires of database system in case a point in the database system fails (e.g., a node in a multi-node database system fails). Yet as another example, a map can be used to provide elasticity, whereby, maps can be used to allow growth and reductions of tables in a dynamic manner without having to shut down a database system. For example, one or more tables can be expanded or reduced by using an alternative map that effectively replaces the old map. Still another example is a "software only" application, where maps, for example, allow assignment of tables in consideration of Cloud, Commodity and Open Platform environments, where no specific hardware or platform limitations (e.g., a Raid, Shared Array) need to be made to define maps.

In other words, a map M (shown in FIG. 1A) can effectively assign a particular type of data or data component of a database to a container (e.g., a bucket) in various ways without virtually any limitations. One example of a particular type of data or data component that is currently prevalent in databases is a database table (or "table"). As such, tables will further be used as an example to further elaborate on how a map M can be effectively used to assign data for various purposes.

FIG. 4 depicts maps that effectively assign data of a database, including tables, to buckets and AMPS for various applications in accordance with one embodiment. In this example, AMPS can be assigned in consideration of Open platforms as well as targeted platforms (e.g., a platform built for a specific purpose, for example, such as, a platform built to provide faster access by using memory instead of disk storage provided by other platforms.

Figure 5:
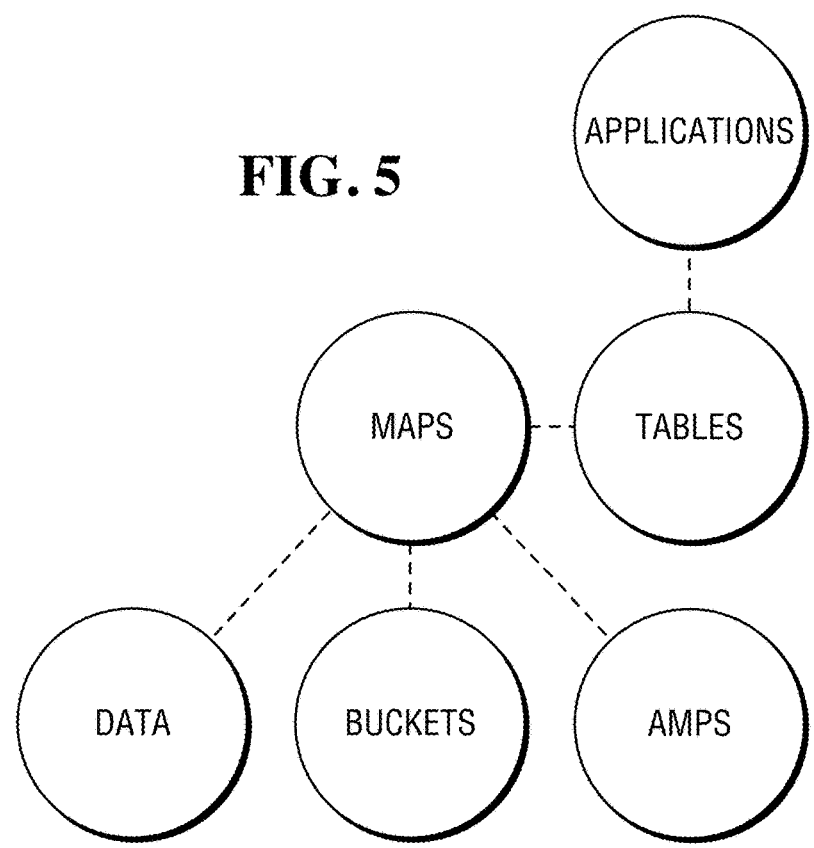
FIG. 5 depicts maps that can effectively assign data of a database, including specific data components (e.g., tables) to containers (e.g., buckets) and processing units (e.g., AMPS) for various applications and in consideration of desired platforms in accordance with one embodiment.

More generally, FIG. 5 depicts maps that can effectively assign data of a database, including specific data components (e.g., tables) to containers (e.g., buckets) and processing units (e.g., AMPS) for various applications (e.g., optimizations, fault resiliency, elasticity, "software only" applications) and in consideration of desired platforms (e.g., Open Platforms, purpose-built platforms) in accordance with one embodiment.

Figure 6:
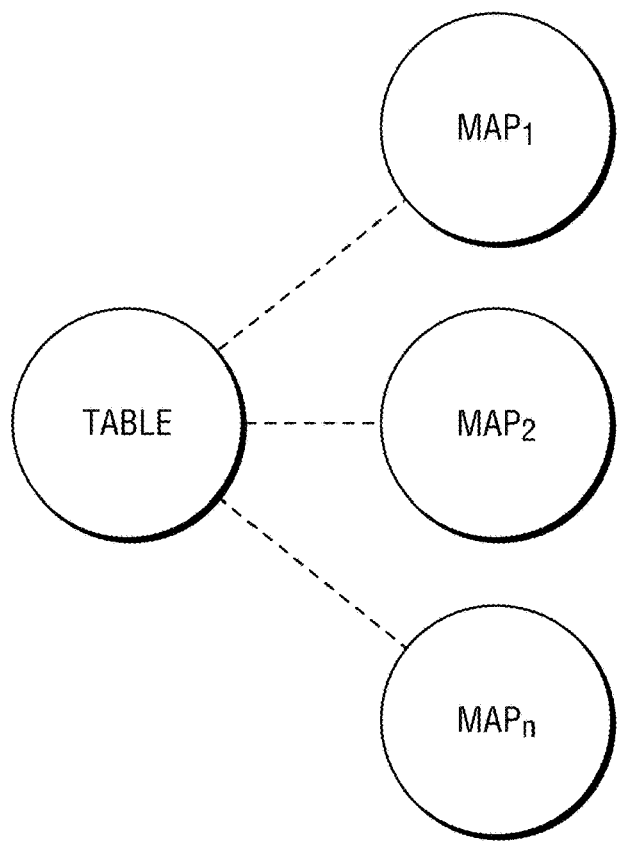
FIG. 6 depicts a table that can be effectively assigned to multiple maps for various purposes and/or applications in accordance with one embodiment.

To elaborate even further, FIG. 6 depicts a table that can be effectively assigned to multiple maps for various purposes and/or applications in accordance with one embodiment. By way of example, those skilled in the art will appreciate that a table can be stored in multiple maps for data protection allowing, for example, RAID alterative or augmentation applications, fault domains, and permuted maps, etc.

Figure 7:
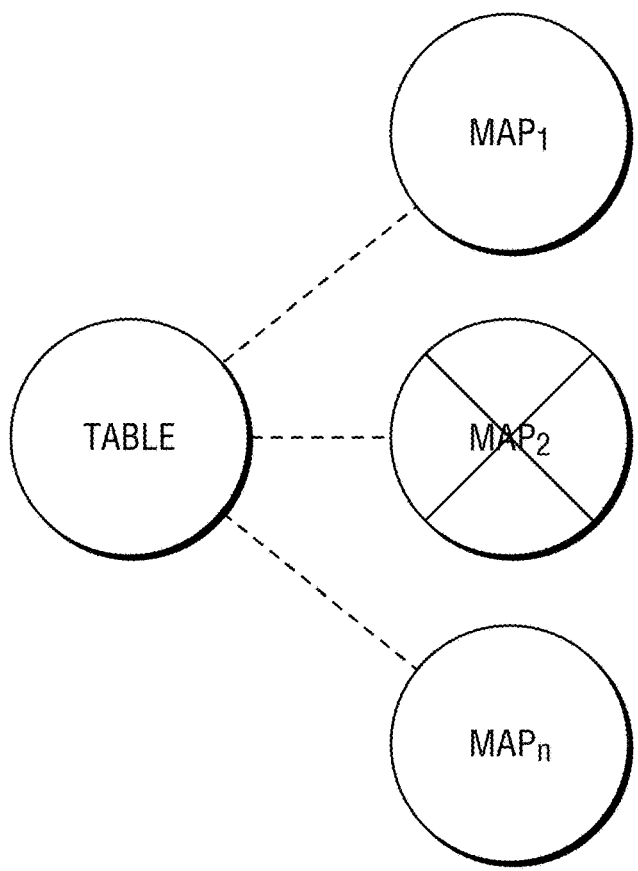
FIG. 7 depicts maps that can have various states (e.g., active, inactive, on-line, offline) where the maps can be associated with a single table or a set of tables in accordance with one embodiment.

FIG. 7 depicts maps that can have various states (e.g., active, inactive, on-line, offline) where the maps can be associated with a single table or a set of tables in accordance with one embodiment. By way of example, at a given time, a number of maps can be on-line or active while a number of other maps can be inactive or offline. In the example, the maps that are on-line or active can be made to be consistent with each other as it will be appreciated by those skilled in the art. It should also be noted that at a given time, a part of a map may be active or online while another part of the map can be inactive or offline.

In addition to various states that can be assigned to map and synchronization that can be made to ensure consistency, various other operations can be performed on maps. For example, the maps can associated with one or more tables of a database.

Figure 8:
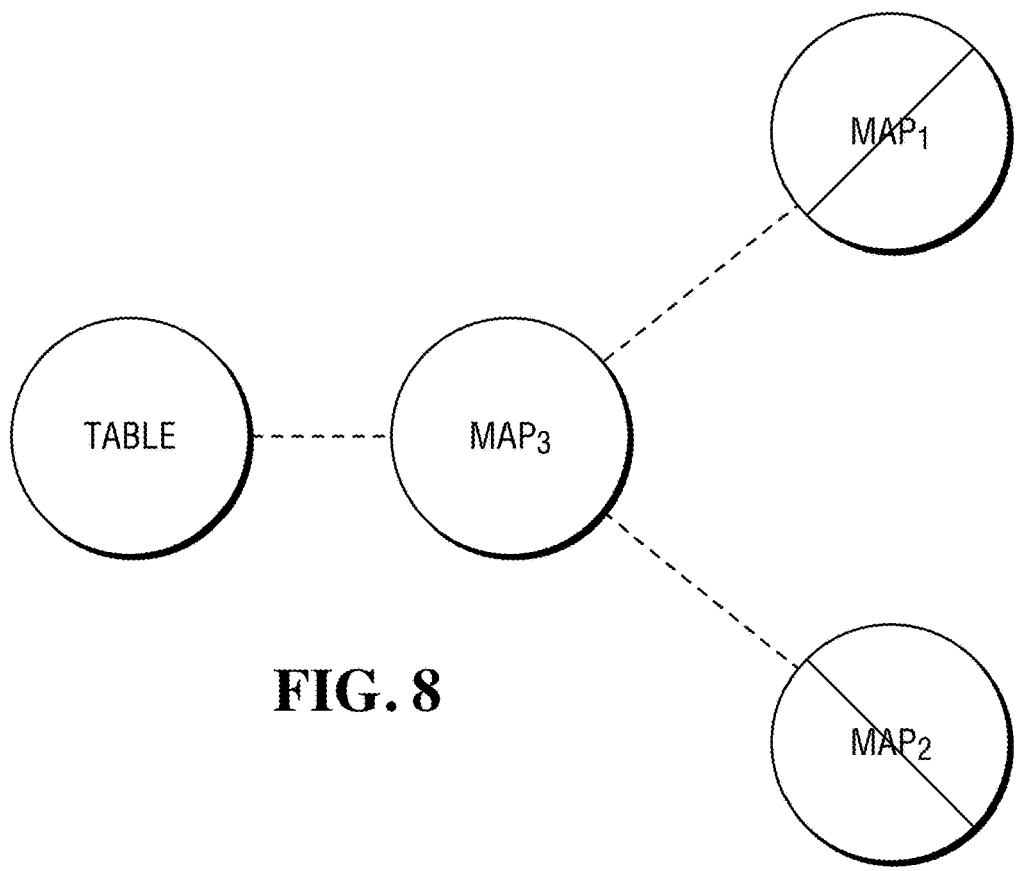
FIG. 8 depicts merger of two maps (Map 1 and Map 2) that are partially offline to form a map (Map 3) that can then be brought in its entirety or completely online in accordance with one embodiment.

To further elaborate, FIG. 8 depicts merger of two maps (Map 1 and Map 2) that are partially offline to form a map (Map 3) that can then be brought in its entirety or completely online in accordance with one embodiment. By way of example, permuted maps can be merged to provide node failure resiliency in a multi-node database system. As such, maps can be formed in a dynamic manner without having to fully shutdown a database system in order to reconfigure it.

Figure 9:
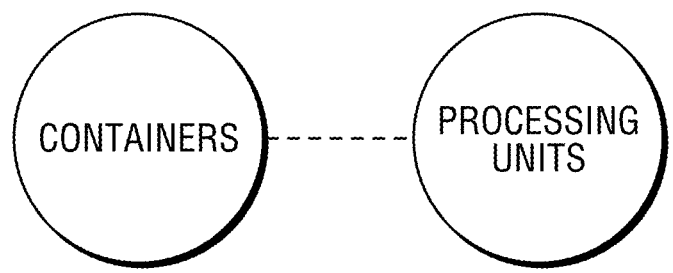
FIG. 9 depicts processing units (e.g., parallel processing units) that can be online or offline at a given time in accordance with one embodiment.
Figure 9:
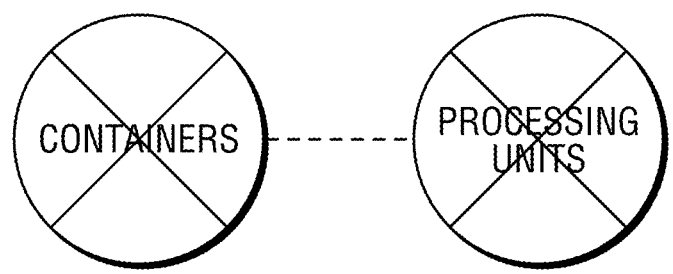

It should also be noted that containers (e.g., buckets) and processing units (e.g., AMPs) can also different states, including, for example, active, inactive, on-line and offline. FIG. 9 depicts processing units (e.g., parallel processing units) that can be online or offline at a given time in accordance with one embodiment.

Figure 10:
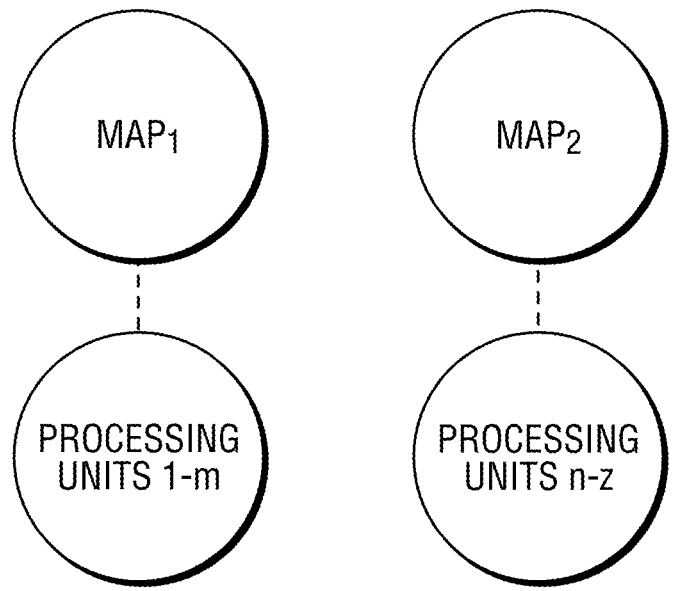
FIG. 10 depicts disjoint maps associated with different pools of processing units (e.g., Parallel AMP units in a multi-node database system) in accordance with one embodiment.

FIG. 10 depicts disjoint maps associated with different pools of processing units (e.g., Parallel AMP units in a multi-node database system) in accordance with one embodiment.

Figure 11:
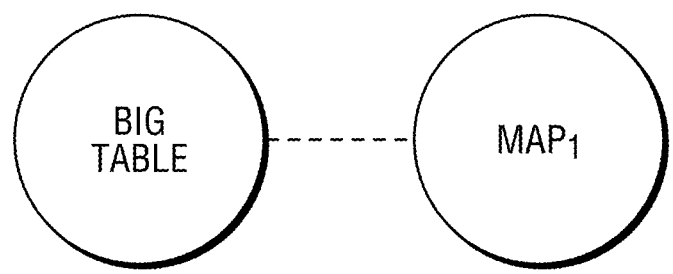
FIG. 11 depicts storage of tables in disjoint maps in accordance with one embodiment.
Figure 11:
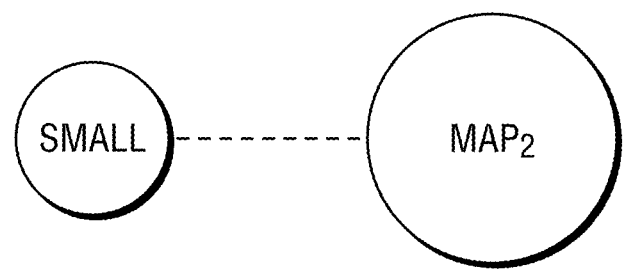

FIG. 11 depicts storage of tables in disjoint maps in accordance with one embodiment. Referring to FIG. 11, a relatively larger (or big) table is stored in a first map (map 1) and a relatively smaller (or small) table is stored in another map that is a disjoint map from the first map, namely, a second map (map 2). It will be appreciated that the configuration depicted in FIG. 11 can be used for a number of application provide a number of advantages, including, for example, more efficient access to data stored in tables of a database, and hardware acceleration.

In view of the foregoing, it will be appreciated that maps can be provided in an intelligent manner (map intelligence). Maps provided in accordance with one or aspects, among other things, can allow parallel database systems to change dynamically and transparently. In addition, maps can be provided in a highly intelligent manner with an optimizer that can effectively use the maps to improve the processing of database queries in a database system.

Figure 12:
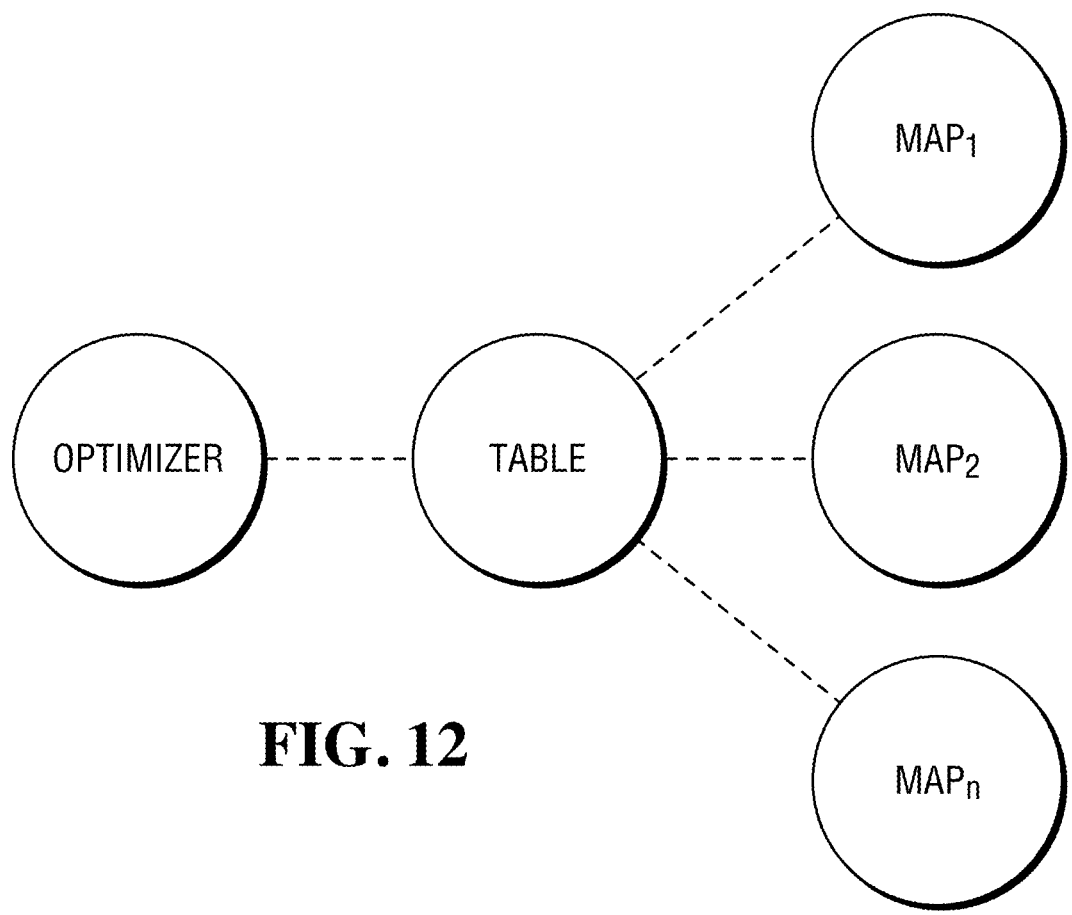
FIG. 12 depicts a map-aware optimizer configured to use multiple maps ($Map_1$-$Map_n$) that are associated with one or more tables in order to optimize processing of database queries relating to the one or more tables in a database system that stores the one or more tables in accordance with one embodiment.

To elaborate still further, FIG. 12 depicts a map-aware optimizer configured to use multiple maps ($Map_1$-$Map_n$) that are associated with one or more tables in order to optimize processing of database queries relating to the one or more tables in a database system that stores the one or more tables in accordance with one embodiment. It should be noted that multiple maps ($Map_1$-$Map_n$) can be associated with a single table of a database.

Figure 13:
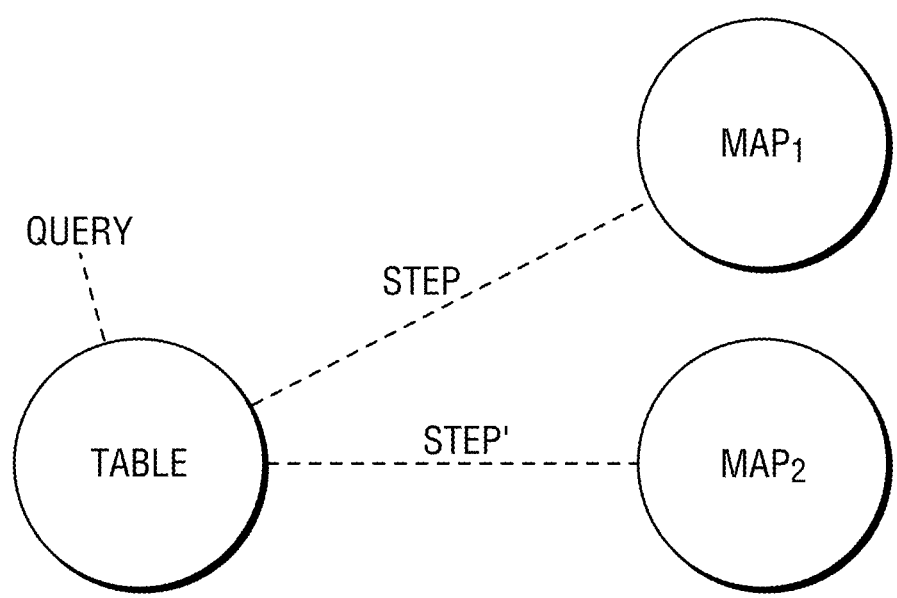
FIG. 13 depicts processing of database queries associated with one or more tables in tandem (tandem queries) in accordance with one embodiment.

As another example, FIG. 13 depicts processing of database queries associated with one or more tables in tandem (tandem queries) in accordance with one embodiment. Referring to FIG. 13, "active redundancy" can be achieved by processing virtually all query steps redundantly on multiple maps ($Map_1$ and $Map_2$) as multiple processes, whereby the first process to complete can allow the query to advance. In this example, spools from streams that do not complete within a determined amount of time can be abandoned. Also, "reactive redundancy" can be achieved by attempting to execute each step of a database query in one map (e.g., $Map_1$) provided for one or more tables. However, in case of a failure of one or more steps of the database query, the one or more steps can be executed using another map (e.g., $Map_2$) that is also provided for the one or more tables. It should be noted that redundancy provided by multiple maps can eliminate the need to restart the database query when there is failure. By way of example, when a node in a multi-node database system fails, an alternative node provided by an alternative map can be used.

Figure 14:
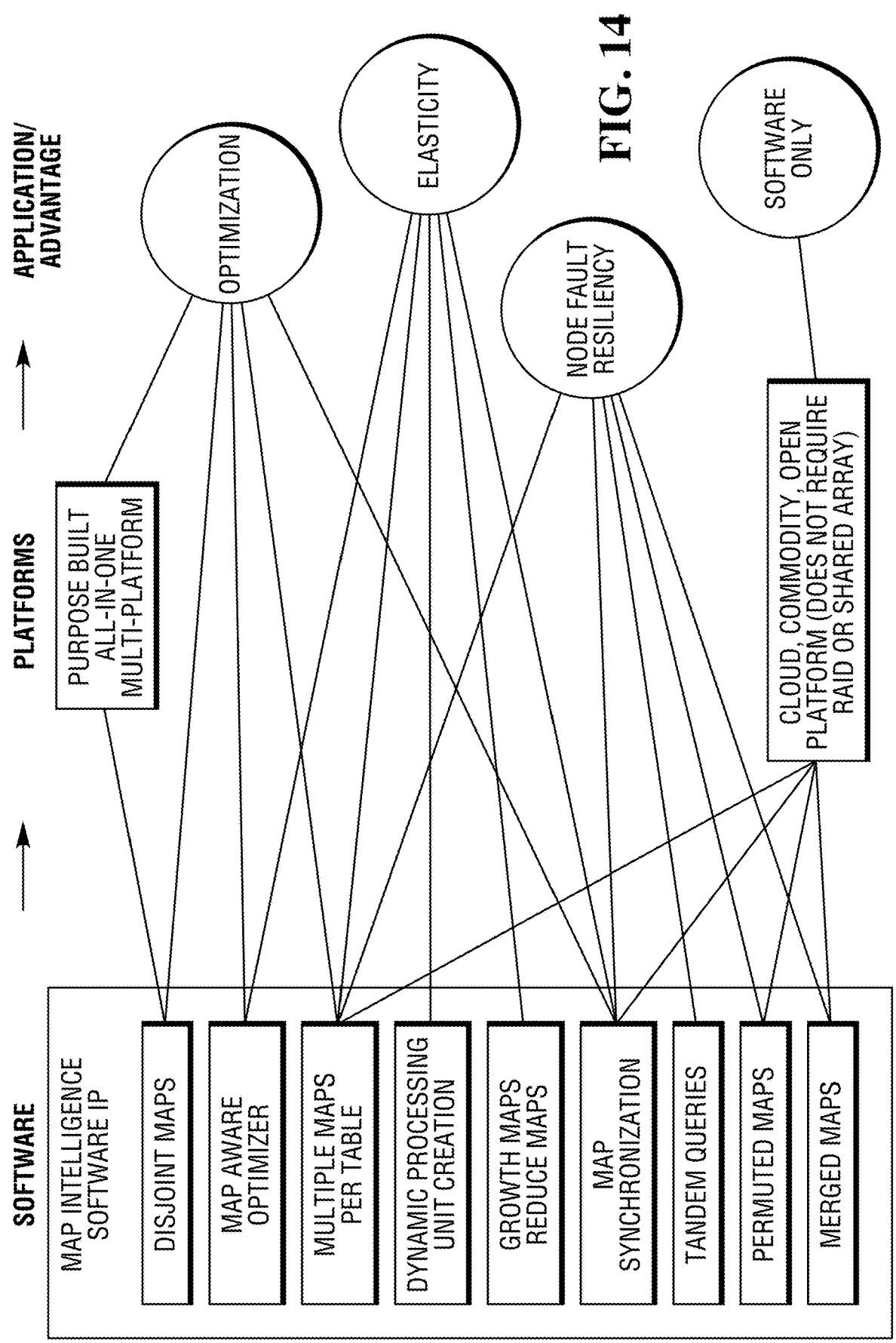
FIG. 14 depicts exemplary features associated with maps that can be provided in accordance with one or more embodiments.

FIG. 14 depicts exemplary features associated with maps that can be provided in accordance with one or more embodiments. FIG. 14 can also provide a summary of some of the features associated with map that are noted above. Referring to FIG. 14, as one exemplary feature, disjointed maps can be used for purpose built platforms, all-in-one platforms and multi-platforms. Disjointed maps can allow better database query optimization. Optimization can also be achieved by using map-aware optimizers and map synchronization. Elasticity can be achieved by using one or more exemplary features, namely, map-aware optimizers, dynamic processing unit (e.g., AMP) creation, map synchronization, and so on.

It should be noted that numerous operations associated with maps can be performed in databases. For example, a new map can be created. A map can be deleted. Maps can be merged. Maps can grow and shrink reduced in size. Maps can be activated or deactivated. Data in one map can be synchronized by data in another map. Data can be mapped to containers (e.g., buckets) using virtually any desired assignment. Similarly, containers can be assigned to processing units (e.g., AMPS) using virtually any desired assignment. Similarly, maps allow creation of new processing units (e.g., AMPS) in a database system. A processing unit can be assigned an identifier (e.g., an Amp number). A map can be created that includes a new processing unit *(e.g., a new AMP). A map that includes a particular processing unit can be deleted or deactivated. Generally, a processing unit may appear in no maps, multiple maps, many maps, or even all the maps. A processing unit that appears in no maps may, for example, be associated with a processing unit that is being configured or one that has been effectively removed from a database system. Each map can, for example, refer to a set of processing units, wherein the sets may overlap partially or fully, or be disjointed. Also, a container may exist in one more maps, may be associated with one or more processing units.

Figure 15:
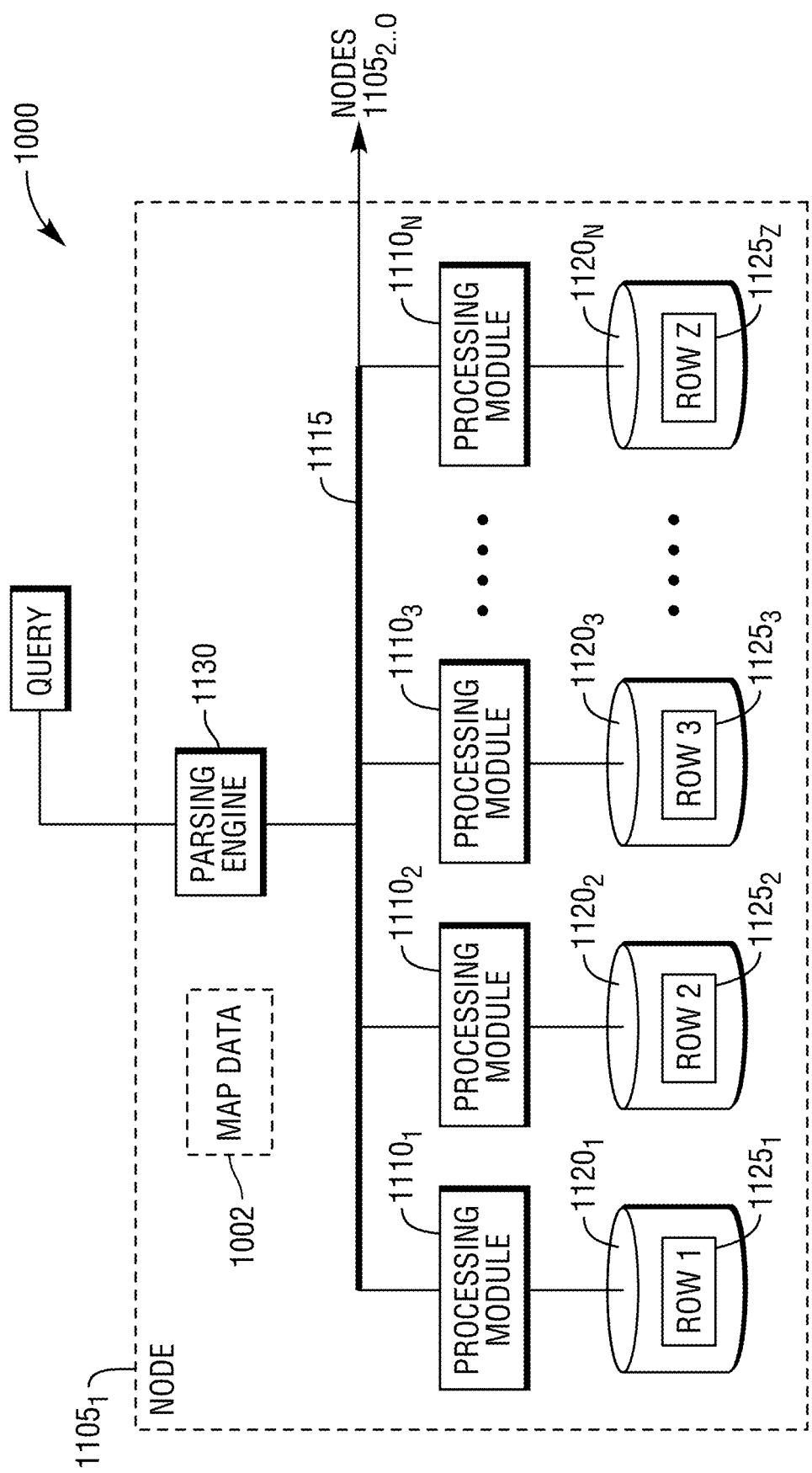
FIG. 15 depicts an exemplary architecture for one database node 11051 of the DBMS 100 in accordance with one embodiment.

FIG. 15 depicts an exemplary architecture for one database node 11051 of the DBMS 100 in accordance with one embodiment. The DBMS node 11051 includes one or more processing modules 1110-N connected by a network 1115, that manage the storage and retrieval of data in data-storage facilities 11201-N. Each of the processing modules 1110-N represents one or more physical processors or virtual processors, with one or more virtual processors running on one or more physical processors. For the case in which one or more virtual processors are running on a single physical processor, the single physical processor swaps between the set of N virtual processors. For the case in which N virtual processors are running on an M-processor node, the node's operating system schedules the N virtual processors to run on its set of M physical processors. If there are four (4) virtual processors and four (4) physical processors, then typically each virtual processor would run on its own physical processor. If there are eight (8) virtual processors and four (4) physical processors, the operating system would schedule the eight (8) virtual processors against the four (4) physical processors, in which case swapping of the virtual processors would occur. Each of the processing modules 11101-N manages a portion of a database stored in a corresponding one of the data-storage facilities 1201-N. Each of the data-storage facilities 11201-N can includes one or more storage devices (e.g., disk drives). The DBMS 1000 may include additional database nodes 11052-O in addition to the node 11051. The additional database nodes 11052-O are connected by extending the network 1115. Data can be stored in one or more tables in the data-storage facilities 11201-N. The rows 11251-z of the tables can be stored across multiple data-storage facilities 11201-N to ensure that workload is distributed evenly across the processing modules 11101-N. A parsing engine 1130 organizes the storage of data and the distribution of table rows 11251-z among the processing modules 11101-N. The parsing engine 1130 also coordinates the retrieval of data from the data-storage facilities 11201-N in response to queries received, for example, from a user. The DBMS 1000 usually receives queries and commands to build tables in a standard format, such as SQL.

In one embodiment, the rows 11251-z are distributed across the data-storage facilities 11201-N associated with processing modules 11101-N, by the parsing engine 1130 in accordance with mapping data or map (1002).

Figure 16:
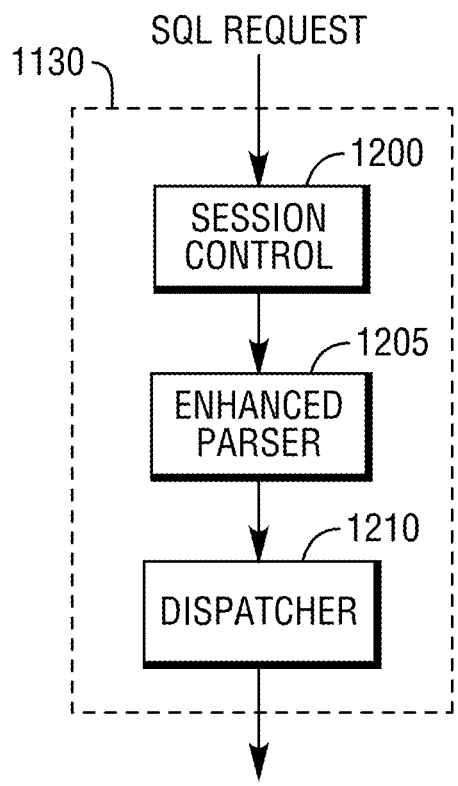
FIGS. 16 and 17 depict a parser in accordance with one embodiment.

In one exemplary system, the parsing engine 1130 is made up of three components: a session control 1200, a parser 1205, and a dispatcher 1210, as shown in FIG. 16. The session control 1200 provides the logon and logoff function. It accepts a request for authorization to access the database, verifies it, and then either allows or disallows the access. When the session control 1200 allows a session to begin, a user may submit a SQL request, which is routed to the parser 1205. Regarding the dispatcher 1210, it should be noted that some monitoring functionality for capacity and workload management may be performed by a regulator (e.g., regulator 415). The Regulator can monitor capacity and workloads internally. It can, for example, do this by using internal messages sent from the AMPs to the dispatcher 1210. The dispatcher 1210 provides an internal status of every session and request running on the system. It does this by using internal messages sent from the AMPs to the dispatcher 1210. The dispatcher 1210 provides an internal status of every session and request running on the system.

Figure 17:
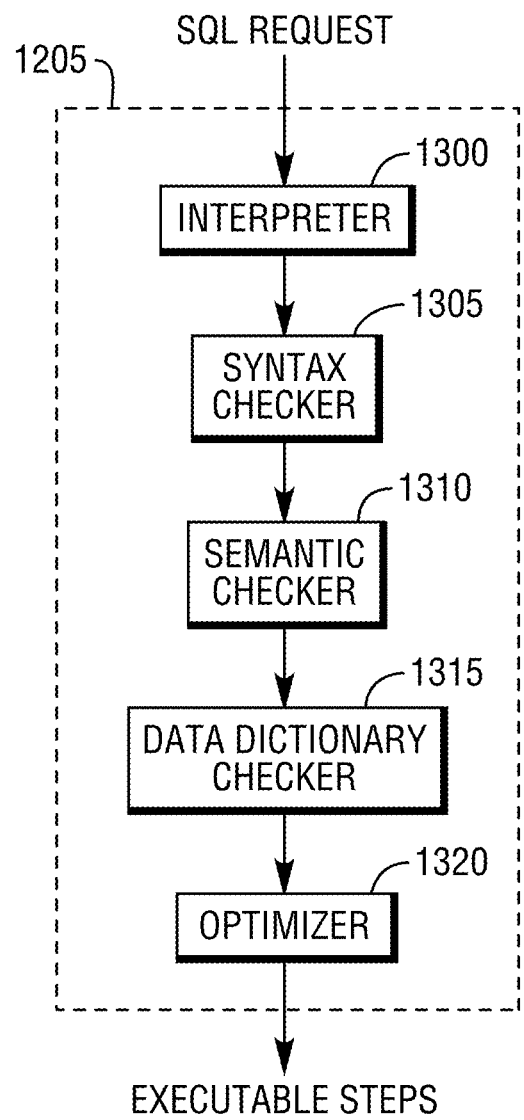

As depicted in FIG. 17, the parser 1205 interprets the SQL request (block 1300), checks it for proper SQL syntax (block 1305), evaluates it semantically (block 1310), and consults a data dictionary to ensure that all of the objects specified in the SQL request actually exist and that the user has the authority to perform the request (block 1305). Finally, the parser 1205 runs an optimizer (block 1320), which generates the least expensive plan to perform the request.

Management of Maps

As noted above with reference to FIG. 1A, an Intelligent (or open or robust) Mapping System (IMS) 102 can perform various map related operations, including, for example, creating new maps, deleting maps, growing a map, shrinking a map, merging maps, separating or dividing a map into multiple maps, activating (or bringing online) a map and deactivating (bringing offline) a map. For example, the IMS 102 can facilitate creation of new maps for new data and/or new processing units, as data becomes available for storage in the database 101 and/or as new processing units are added to the database system 102. Similarly, old maps pertaining to data no longer needed and/or old maps pertaining to processing units that are to be removed from the database system 102 can be deleted. As another example, maps can become active or inactive during a reconfiguration process in a dynamic manner allowing the database system 102 to still operate with a set of active maps.

To further elaborate, FIG. 18 depicts an IMS 1800 in accordance with another embodiment. Referring to FIG. 18, the IMS 1800 can be configured to facilitate generation of one or more maps 1802 based on one or more others maps 1804. In other words, IMS 1800 can effectively reassign (or move) data from one or maps 1804 to one or more other maps, namely one or more maps 1802. For example, the one or more maps 1802 can be one or more new maps and the one or more maps 1804 can be one or more existing maps.

In the example shown in FIG. 18, one or more maps 1804 effectively map distinct data portions (D1-DN) of a database (also shown in FIG. 1A) to one or more processing units (P1-P1000) for processing. This mapping can, for example, be done by using containers that map a distinct data portion Di (e.g., a database table) to one or more of the processing units (P1-P1000) in accordance with one or more distribution schemes (e.g., hashing, round robin, selective round robin, a single processor). In other words, assignment of one or more particular distribution schemes can be conceptually represented by a container, or a container can be representative of one or more particular distribution schemes that have been assigned. As such, a containers not necessary but can be used for better illustration. In effect, map 1804 can map distinct data portions to one or more processing units for processing in accordance with virtually any desired scheme. As such, a distinct data portion D1 (e.g., a database table T1) can, for example, be mapped for processing to processing units P1-P1000 in accordance with a hashing scheme, but another distinct data portion D2 (e.g., a database table T2) can, for example, be mapped for processing to a single processing unit P1, and yet another distinct data portion D3 (e.g., a database table T4) can, for example, be assigned to P1, P3, P5 and P11, and so on.

As noted above, map 1804 can, for example, represent a preexisting map, but map 1802 can, for example, represent a new or a newer map that is being generated or has been more recently generated. Generally, generation of a map 1802 based on map 1804 can be accomplished by the IMS 1800 in a manner that would reduce or minimize the adverse effects experienced. For example, when a new map is generated to accommodate new data and/or additional new processing units (e.g., P1001-P1200), it is desirable to effectively reassign the preexisting data to take advantage of the new processing units. In the example depicted in FIG. 18, new distinct data portion DN+1 is mapped in a map 1802 to additional processing units (P1001-P1200). Although, maps 1802 and 1804 can both be used, it may be more desirable to effectively move at least some of the data to the map 1802 for better efficiency, but this move should also be done in a manner that would minimize adverse side effects (e.g., unavailability of the database to users). As such, it may be desirable to move data in stages or gradually at times that may reduce adverse side effects (e.g., when the database system is not very active). However, this reassignment (or effective moving of data from map 1804 to map 1802) can pose difficult problems given the desirability to minimize adverse effects to the database system. Those skilled art will appreciate that in practice thousands of tables and several processing units may be employed. Also database tables may have very complicated relationships in a database system that uses very complex queries with extremely complex database query plans in order to optimize database query execution.

Referring to FIG. 18, it will be appreciated that IMS 1800 can effectively select a subset of distinct data portions of Map 1804 for assignment to a map 1804 in order to minimize adverse side effects. For example, the IMS 1800 can effectively select data portions {D1, D4, D6 and D7} from map 1804 as suitable candidates for assignment to the map 1802. As will described below in greater detail, this selection can be made based on monitored data 1810. The monitored data 1810 can, for example, represent data stored (or logged) when the database system is executing database queries. For example, database tables that are relatively small can be considered relevant to "Sparse" maps and "non-small" can be relevant to "Contiguous" maps. Generally, the IMS 1800 can indentify data portions of the map 1804 that are suitable for reassignment based on their relevancy to the type of the map of the target map, namely map 1802. In any case, the IMS 1800 can identify a subset or set of distinct data currently assigned to map 1804 for assignment in a second map 1802. For example, data portions {D1, D4, D6 and D7} can be selected by the IMS 1800 based on the monitored data 1810 that is representative of the executed database query plans. For example, database tables that may be relevant or suitable to the map 1802 can be identified by the IMS 1800.

IMS 1800 can then effectively group together the data in the selected set: data portions {D1, D4, D6 and D7} in order to identify distinct data portions that are to be moved together to the map 1802. For example, the IMS 1800 may determine that distinct data portions {D1 and D7} should be moved together (or effectively at the same time) and distinct data portions {D4 and D6} should be moved together. As another example, the IMS 1800 may determine that distinct data portions {D1, D4 and D6} should be moved together to the map 1802. As will be discussed in greater detail below, the IMS 1800 can, for example, determine the groups based on a determined frequency use and/or a determined cost associated with a group of two or more distinct data portions. The IMS 1800 can also consider the size relationships (e.g., strong inplace joining relationships) between the two or more distinct data portions, as well as their size in determining the groups of distinct data portions that should be reassigned (or effectively moved) to the map 1802. For example, the IMS 1800 can be configured to recursively analyze logged query plan operations (or phases) in the monitored data 1810 to identify one or more specific operations (e.g., "inplace join paths). Generally, the IMS 1800 can generate a list or an ordered list of reassigning groups, such that each one the groups has one or more data portions.

It will also be appreciated that IMS 1800 can also be configured to facilitate the reassignment (or effective movement) of the selected data portions to the map 1804 in the determined groups. As such, IMS 1800 can estimate the time required to effectively move a data portion to the map 1802 and identify a time for scheduling movement or reassignment of a particular selected group to the map 1802. For example, after determining that that distinct data portions {D1 and D7} should be moved together (or effectively at the same time) and distinct data portions {D4 and D6} should be moved together, the IMS may determine a first suitable time or time period to move {D4 and D6} and then a second time or time period to move data portions {D1 and D7}. As such, the IMS 1800 can, for example, facilitate moving data portions {D4 and D6} as a first group at a first determined opportune time suitable for the first group, and facilitate moving data portions {D1 and D7} later, as a second group, at another determined time that may be more suitable for moving the second group. As such, the IMS 1800 can effectively provide or serve as an automated map (or mapping) tool that identify groups of data portions of the map 1804 and facilitate their move in groups or stages in order at times more appropriate in accordance with one or more embodiments.

As will be described in greater detail below, the IMS 1800 can be, for example, be provided as a Map Automation component that can include a Map Advisor component, a Map mover (or moving) component in accordance with one or more embodiments. The IMS 1800 can also provide an analyzing component that can, for example, use an "analyzing logged query plan" scheme in accordance with another embodiment, as will be described in greater detail below. In addition, The IMS 1800 can, for example, use an "assigning tables to Groups" scheme in accordance with yet another embodiment, as will also be described in greater detail below.

Figure 19:
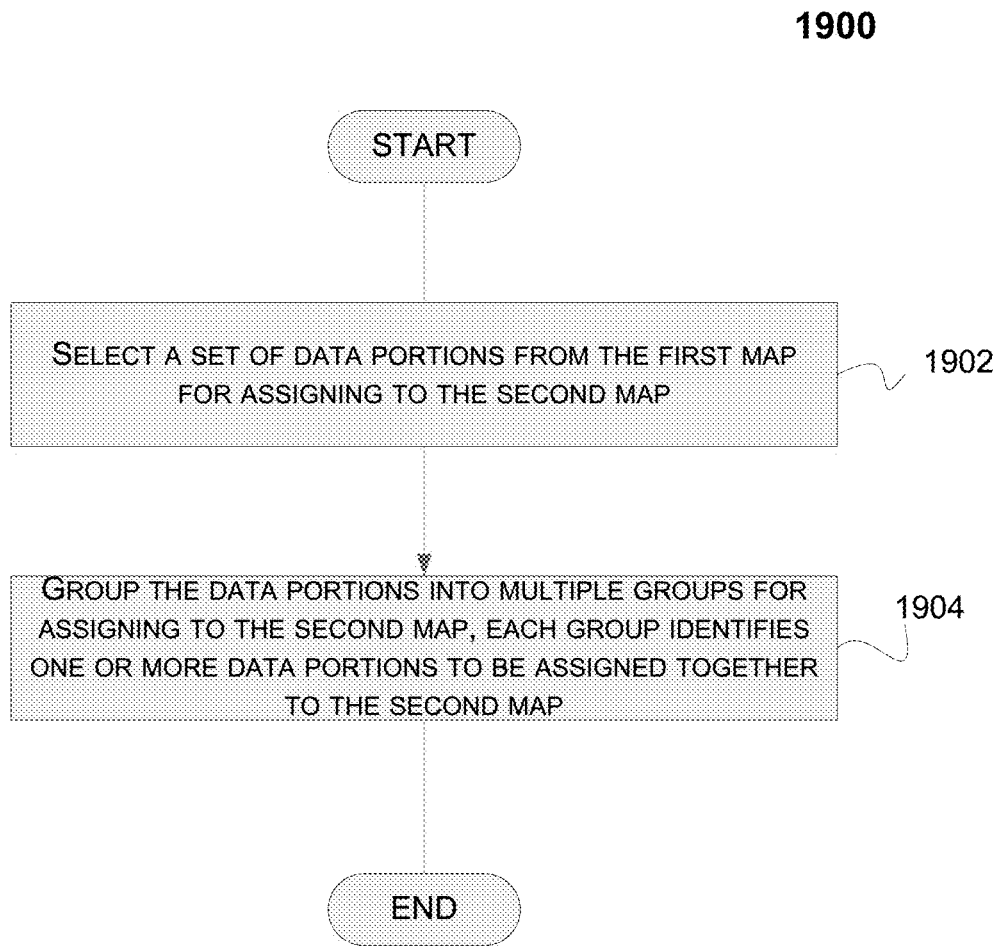
FIG. 19 depicts a map management method for reassignment of data from one map to another map in a database system in accordance with another embodiment.

Referring now to FIG. 19, a map management method 1900 for reassignment of data from one map to another map in a database system is depicted in accordance with one embodiment. It should be noted that the data can be in distinct data portions (e.g., distinct database tables) assigned to a first map for processing by multiple processing units of a database system configured to process data stored in a database. As such, the method 1900 reassigns the data portions assigned to a first map to a second map for processing by multiple processing units of a database system configured to process data stored in a database. The method 1900 can, for example, be implemented by the IMS 1800 (shown in FIG. 18). As such, the method 1900 can, for example, be implemented as computer-implemented method using one or more physical processors configured to access computer executable code stored in a non-transitory computer storage medium. It should be noted that the first map assigns each one of the distinct data portions to one or more multiple processing units of a database system for processing in accordance with one or more distributions schemes (e.g., hashing, round robin, selective round robin). Referring to FIG. 19, a set of distinct data portions assigned to the first map are selected (1902) for assignment (or reassignment) to the second map as selected data portions. For example, the distinct data portions can be selected at least partly based data pertaining to execution of one or more database queries. Typically, data portions that may be suitable for reassignment are selected.

Next, multiple reassigning group for the selected data portions are determined (1904). A reassigning group can identifies one or more of the selected data portions from the first map for reassigned to the second map. Typically, at least one group of two or more data portions can be identified as a group for reassignment to the second map. The determination (1904) of the multiple groups can also be determined at least based on data pertaining to execution of one or more database query plans (e.g., execution plans that have used the first map and/or the second map). The determination (1904) of the multiple groups can also take into consideration the relationships between two or more of the selected data portions in view of the data pertaining to execution of one or more database query plans. In addition, the determination (1904) of the group(s) can also be made at least partly based on the number of times that two or more of the selected data portions (e.g., selected databases tables) have been involved in one or more particular database operations (e.g., join operations) needed to execute one or more database query plans and/or the cost associated with performing one or more database operations performed in relation to the two or more of the selected data portions in order to execute one or more database query plans that have used the two or more of the selected data portions. For example, logged query plan operations can be recursively analyzed to identify "inplace join" paths associated with the two or more of the selected database table and the database tables can be assigned to groups to perverse the dominant query level join paths, as will be discussed in greater detail below. Management method 1900 ends after the reassigning groups are determined (1904).

Although not shown in FIG. 19, it should be noted that monitoring of database query execution plans can optionally be performed as a part of the map management method 1900. In addition, reassignment or movement of data can also be optionally performed as part of the map management method 1900 (not shown). For example, a first group and a second group can be indentified for reassignment to the second map, such that each one of the first and a second groups identifies one or more data portions selected for reassignment. In addition, optionally, as a part of the map management method 1900, a first time or first time period for reassigning the first group from a first map to a second map can be determined and scheduled. This determination can, for example, be made based on more or more of the following: the size of the data portions of the first group, the time needed to reassign the first group, and a determined workload of the database system. Similarly, a second time or second time period for reassigning the one or more data portions of a second group of data portions (e.g., database tables) from the first map to the second ma can be determined and facilitated as a part of the map management method 1900.

To elaborate even further, additional exemplary embodiment are further described below in sections: "Map Management Automation, "Map Advisor," "Analyzing Logged Query Plans," and assigning tables to groups.

Other sections provide yet additional embodiments reassigning group for the selected data portions is determined (1904).

Other additional sections describe yet additional embodiments that can, for example, be provided by a IMS 1800 to manage "Sparse" tables, select data for reassignment to new processing units, and moving data in a particular time window.

Map Management Automation

In accordance with one or more embodiments, one or more automated tools can be provided. The automated tools can be designed, for example, to assist users with moving tables to newly defined maps that were created as part of a recent system expansion (or contraction). As such, An Advisor tool can recommend groups of related user tables to move together from their existing map to a new map with the goal of preserving efficient query execution plans. A Mover tool can coordinate and executes the actions for moving table data to a new map and can accept Advisor output recommendations as its input. These tools can, for example, be implemented by a set of Teradata-supplied stored procedures that represent an open API that can be called directly by customer scripts or Teradata clients, such as Viewpoint.

The main database system (DBS) components for these tools can, for example, include:

A new system database TDMaps that stores metadata for the automated management of maps along with results from procedure calls.

Advisor procedures capable of analyzing user objects and logged query plans to make recommendations for moving a set of tables onto a caller specified contiguous or sparse map. The output recommendations can optionally be customized by callers and then input to the Mover.

Mover procedures capable of moving the data for a specified list of tables to new maps using the ALTER TABLE statement with a MAP clause. Multiple worker sessions can be used to achieve the desired level of concurrency. A single manager session monitors the worker sessions and enforces any user-specified time limit.

Database Query Logging (DBQL) options whose metadata provides information about query plan steps and the tables they reference which in turn provides the necessary input to Advisor.

The example below demonstrates the operations (1-5) a user would perform in using procedures) (e.g., TDMaps procedures) to expand their system onto a newly created map. For the sake of this example, assume the following map has recently been created as part of a system expansion:

SHOW MAP TD_Map2;
    CREATE MAP TD_Map2

CONTIGUOUS
AMPCOUNT=400
AMP BETWEEN 0 AND 399;
1. Enable step level Query Logging in preparation for calling the Map Advisor. Leave logging enabled for 7 days which is sufficient to capture a set of queries that are representative of the workload for this particular system.
BEGIN QUERY LOGGING WITH STEPINFO ON FOR ALL;
2. Call an Advisor procedure to analyze the last 7 days in the query log and generate a recommended list of actions for moving selected tables (Alter action) into TD_Map2 while potentialy excluding others due to their small size.
CALL TDMaps.AnalyzeSP
 ('TD_Map2',
 CURRENT_DATE—INTERVAL '7' day,
 'MyMoveTableList'); /* user assigned name of generated actions list */
Examine the Advisor results by querying a table in TDMaps. Those actions with the same value in output column GroupOrder are in the same group.
SELECT Action, DatabaseName, TableName, GroupOrder FROM TDMaps.ActionsTbl
WHERE ActionListName='MyMoveTableList';
ORDER BY 1, 4, 3, 2;

| Action | DatabaseName | TableName | GroupOrder |
|---|---|---|---|
| Alter | db2 | JoinTab1 | 1 |
| Alter | db2 | JoinTab2 | 1 |
| Alter | db2 | OtherTab | 2 |
| Alter | db1 | LargeTab | 3 |
| Alter | db1 | MediumTab | 3 |
| Exclude | db1 | TinyTab | NULL |
| Exclude | db2 | SmallTab | NULL |
| Exclude | db3 | SmallToMediumTab | NULL |

3 (Optional) User customizes the Advisor recommended actions by including table 'SmallToMedium' in the list of tables identified for expansion and lowering the moving priority of 'OtherTab'.
UPDATE TDMaps.ActionsTbl
 SET GroupOrder=4
 WHERE DatabaseName='db2' AND TableName='OtherTab'
 AND ActionListName='MyMoveTableList';
UPDATE TDMaps.ActionsTbl
 SET Action='Alter', GroupOrder=5
 WHERE DatabaseName='db3' AND TableName='SmallToMediumTab'
 AND ActionListName='MyMoveTableList';
4. Call Mover procedures with 2 workers to move the tables in a group-at-a-time fashion and specify a time limit of 12 hours (720 minutes).
 Session #1
CALL TDMaps.ManageMoveTablesSP('MyMoveTableList', 720);
 Session #2
CALL TDMaps.MoveTablesSP( );
 Session #3
CALL TDMaps.MoveTablesSP( );
5. Monitor the progress from the Mover operation in 4.
SELECT Status, DatabaseName, Group, TableName, StartTime,
Endtime
FROM TDMaps.ActionHistoryTbl
WHERE ActionListName='MyMoveTableList' AND Action='Alter'
ORDER BY 1, 5, 4;

| Status | Database Name | Table Name | Group | StartTime | EndTime |
|---|---|---|---|---|---|
| Complete | db2 | JoinTab1 | 1 | Oct. 1, 2014 6:00 AM | Oct. 1, 2014 7:20 AM |
| Complete | db2 | JoinTab2 | 1 | Oct. 1, 2014 6:00 AM | Oct. 1, 2014 7:30 AM |
| In Progress | db1 | MediumTab | 3 | Oct. 10, 2014 7:21 AM | |
| In Progress | db1 | LargeTab | 3 | Oct. 10, 2014 7:31 AM | |

Map Advisor
 An Advisor tool can perform the following major tasks:
 Determine which tables in the caller specified object scope are relevant to the specified target map kind and exclude those that are not. In general, "small" tables are relevant to Sparse maps and "non-small" tables are relevant to Contiguous maps.
 Estimate the elapsed time required to move each table to the target map using an ALTER TABLE statement. Such time estimates are needed by Mover stored procedures who must schedule move actions based on user specified time limits.
 Organize the qualifying tables to be moved into suitably sized Groups that represent tables with strong inplace joining relationships. Tables within a group will be queued together for movement by Mover stored procedures thereby limiting the duration in which they reside on different maps and in turn limiting the potential disruption to inplace join steps.
 Prioritize the order in which Groups and tables within Groups should be moved.
 Summarized below are the major processing operations that complete those tasks.
 1) Estimate table size using current perm space figures stored in the data dictionary. The criteria for "small" are based on the estimated #data blocks relative to the number of Amps in the Map.
 2) Estimate elapsed times for individual ALTER TABLE move actions. Separate methods are employed, namely one that is EXPLAIN Optimizer based while another multiplies a cost coefficient to the number of bytes in the table where the cost coefficient is measured by first performing small sample move operations. The more conservative estimate is chosen under the assumption that it's better to overestimate and finish within the estimated time rather than the opposite.
 3) Recursively analyze logged query plan steps to identify inplace join paths. Query log data describing the source tables and target spools for each Join step is read for the caller specified logged time period. For each logged query, the sets of tables involved in consecutive inplace join steps are identified and then aggregated across all queries to record frequency and aggregate join cost.
 This solution requires input in the form of step level query logging that has been performed for a period of time prior to system expansion and the creation of new maps. Each logged row entry represents an individual execution step within a multi-step query plan along with data describing its input relation(s), output spool file, and their associated storage geographies. Identifying tables involved in inplace join steps requires an examination of all steps that perform a join operation and the input paths leading to that step which can consist of any number of single table Retrieve steps, Aggregate, or Join steps along with target spool geographies of type Local materialized, Hash redistributed, or Duplicated.

Query plans involving join steps are conceptually organized as binary trees where the target output of each child step is the source input to its parent step with the overall tree shape being left-deep, right deep, bushy, or any combation thereof. The full input path for any given join step consists of all child steps down to the leaf level where the base table data is initially retrieved. Our solution generates the full input path by performing a recursive SQL query that joins a step's input source identifiers with the matching target output identifiers of the relevant child steps. For each step along the path, the geography of its output and it's cost is recorded.

4) Assign tables to Groups to preserve the dominant query level inplace join paths. The primary factor in deciding how to group together sets of tables for scheduled movement to a new target map is the identification of those tables that are frequently involved in costly inplace join paths. This includes consecutive binary join steps whose intermediate results are materialized inplace within temporary spool files. By moving such tables together as a group within the same move operation, the duration in which performance is degraded from disrupting their inplace joins is minimized.

The initial candidate table groups are formed from the query level inplace join paths from step 3. The distinct candidate groups are then ranked according to their workload frequency and inplace join cost as a means to prioritize groups and eliminate duplicate (common) tables among groups. A given table belonging to two or more candidate groups is assigned to the highest priority group that it is a member of: GroupRank=RANK( )OVER (ORDER BY (WF*JoinFrequency+WC*JoinCostMagnitude) DESC).

The intent of the ranking formula is to favor those table sets with high frequencies and high join costs. Inplace join steps are inherently an efficient operation relative to a non-inplace operation on the same data. Hence, an expensive inplace operation would be even more costly if an uncoordinated movement of its inputs to different maps were to take place. Put another way, the most expensive inplace join steps are the most important ones to try and preserve. In the ranking formula above, JoinCostMagnitude is the number of digits in the average per-query cost for performing inplace join steps on the given table set. The cost will be represented in seconds and the corresponding number of digits should normally range from 1 to 6 (999999=278 hours). Factors WF and WC in the above formula are configurable weighting factors whose default values are 1.0.

This solution recognizes there is a tradeoff in the average size of formed groups (# table members). Larger groups have the advantage of ensuring that all related joining tables are processed together in a given queued move operation. On the other hand, large groups make it more difficult for the Mover tool to schedule and finish entire groups within a user specified time window (e.g., 3 hours). Having more "pauses" or "breaks" between the scheduled movement of smaller groups gives the Mover more decision points to monitor how much time is left and avoid going over the time limit. In general, performing a body of work in smaller chunks provides the best opportunity to maximize the total amount of work done while still adhering to time limits.

To maximize the benefits from this tradeoff, the Advisor chooses final group from among query level candidates rather than attempting to take the union of groups having common table members from different queries. For example, given query level candidate table groups {t1,t2,t3} and {t3,t4,t5}, the Advisor will choose final groups {t1,t2,t3} and {t4,t5} assuming the frequency and join cost of {t1,t2, t3} is greater that {t3,t4,t5}. It will not consider {t1,t2,t3, t4,t5} because its unioned size is considered to be too large in the context of the tradeoffs discussed above.

5) Prioritize tables within Groups based on table size such that the largest tables are given priority when moving to Contiguous maps and the smallest tables are given priority when moving to Sparse maps.

6) Populate table TDMaps.ActionsTbl with rows representing an Alter or Exclude action on each table analyzed by the Advisor call. Insert values for the calculated table size (from step 1), estimated time to move (from step 2), group order (from step 4), and table/action order (from step 5) in the appropriate columns.

Analyzing Logged Query Plans

The first operation in identifying tables involved in inplace join steps is to query the DBQL tables for qualifying STEP INFO logging data based on caller specified inputs including Log StartTime, Log Endtime and DatabaseScope. In addition, the caller specifies if the DBQL data resides in DBC or an exported log database such as PDCRDATA.

In the SQL query depicted in FIG. 20A, tables prefixed with VT_ are Volatile temporary tables used to hold intermediate results. Table function SYSLIB.DBQLStepObjInfo is used to extract and expand the binary object data residing in column DBC.QryLogStepsV.StepObjectInfo.

In the SQL query depicted in FIG. 20A, tables prefixed with VT_ are Volatile temporary tables used to hold intermediate results. Table function SYSLIB.DBQLStepObjInfo is used to extract and expand the binary object data residing in column DBC.QryLogStepsV.StepObjectInfo.

The query depicted in FIG. 20A retrieves object and geography data for each individual RET and JOIN step within each logged query. A recursive query (WITH RECURSIVE clause) as shown below in FIG. 20B is then used to generate the input source paths for each join step along with spool geographies.

All of the full or "leaf" join paths (those whose inputs are ultimately base tables) are then aggregated and any involving non-inplace input geographies are marked using the query depicted in FIG. 20C.

Example

Assume that DBQL STEPINFO logging occurred on the following two logged query plans. In the EXPLAIN-like notation below, left arrows represent a write/sink operation on a target spool whose geography is shown in parentheses. Asterisks denote a join step whose inputs involve inplace (Local) data. Note that Table names rather than Table Ids are used to make the example easier to follow.

Logged query #1 is a 4-way join where each binary join step operates on inplace input. It's set of inplace join tables consist of: {T1,T2}, {T3,T4}, {T1,T2,T3,T4}, and {T1,T2, T3,T3,T5}. Although some are subsets of larger sets, each is separately recorded because their aggregated frequencies across the workload may differ. For example, there may be many queries with an inplace binary join involving {T1,T2} but only a few that have the full 4-way inplace join involving all 5 tables.

1.1 RET T1→Spool_1 (Local)
1.2 RET T2→Spool_2 (Local)
2. Spool_1 JIN* Spool_2→Spool_3 (Local)
3. T3 JIN* T4→Spool_4 (Local)

4. Spool_3 JIN* Spool_4→Spool_5 (Local)
5. Spool_5 JIN* T5→Spool_6 (Response final)

Logged query #2 is another 4-way join but a portion of its binary join steps operate on inputs that were hash redistributed. It's set of inplace join tables consists of: {T1,T2} and {T3,T4}

1.1 RET T1→Spool_1 (Local)
1.2 RET T2→Spool_2 (Local)
2. Spool_1 JIN* Spool_2→Spool_3 (Hash redistributed)
3. T3 JIN* T4→Spool_4 (Local)
4. Spool_3 JIN Spool_4→Spool_5 (Local)
5. Spool_5 JIN T5→Spool_6 (Response final)

Temporary table VT_StepObectInfo would consist of the following rows after performing the initial query that reads data from the DBQL tables, as depicted in FIG. 20D.

After executing the Recursive query on the data in VT_StepObjectInfo, the results in temporary table VT_join_inputs would be as depicted in FIG. 20E.

After executing the aggregate query on the data in VT_join_inputs, the results in temorary table VT_inplace_join_tables would be as depicted in FIG. 20F. These results represent sets of 2 or more tables that participate in inplace join steps.

These query level results are then aggregated to form the set of distinct table sets along with their SUM frequency and AVG per query step costs:

{T1,T2} with Freq=2, AvgQueryCost=35
{T3,T4} with Freq=2, AvgQueryCost=50
{T1,T2,T3,T4} with Freq=1, AvgQueryCost=100
{T1,T2,T3,T4,T5} with Freq=1, AvgQueryCost=120

Assigning Tables to Groups

The operations in forming and prioritizing groups can include (i) Form the initial groups from the query-level inplace join paths, (ii) Rank the groups by workload frequency and average join step cost, and Traverse ranked list from top to bottom and remove duplicate table entries.

The preceding section applied a recursive query to DBQL data to determine sets of two (2) or more tables involved in consecutive inplace join steps. It then aggregated these results to form distinct sets along with frequencies and average per query cost. These table sets form the initial set of candidate groups for our algorithm as they represent the smallest groups that are still capable of preserving a series of consecutive inplace join steps for individual queries. The size of these groups is assumed to represent the "sweet spot" in the table size tradeoff discussed earlier.

Because these table sets represent inplace join paths from different queries across the workload, the same table will often appear in multiple groups. For example, T1 may be joined with T2 in certain queries whereas it's joined with T3 (and not T2) in other queries. Because each table should only be moved once by a given Mover procedure call, the union of the final sets cannot have duplicates. In order to determine which set a particular table should be assigned to, in (ii) we rank the candidate sets by the following weighted formula expressed in SQL. Each table will then be assigned to the highest ranking group that it is a member of:

GroupRank=RANK( )OVER(ORDER BY($WF$*JoinFrequency+ $WC$*JoinCostMagnitude)DESC).

In the ranking formula above, JoinCostMagnitude is the number of digits in the average per-query cost for performing inplace join steps on the given table set. The cost will be represented in seconds and the corresponding number of digits should normally range from 1 to 6 (999999=278 hours). Factors WF and WC in the above formula are configurable weighting factors whose default values are 1.0.

(iii) then traverses the ranked groups from highest to lowest ranked and removes any tables in the current group that have already been assigned to a previously traversed group. The ranking of groups that have tables removed is not changed in order to preserve the importance of the joining relationship with the table that was reassigned to a higher ranked group. Under this paradigm, a lower ranked group may lose one of its member tables but it will retain its relative ordering among other groups.

Certain tables may not be involved in any logged inplace join operations and thus their frequency and step cost will be zero. Such sets are referred to as "loners" and will be ranked lower than all other sets that have inplace joins. Among loners, those with a larger estimated table size will be ranked higher under the assumption that larger tables will benefit more from moving to a large map (system expansion). It is also possible for loners to exist after duplicates are removed during Step 3 although as note above such reduced sets retain their original ranking.

If the DestinationMap specified in the call to Advisor stored procedure is of type Sparse, all non-excluded tables that are being processed in this step are assumed to "small". To promote inplace joins, every table in each group is assigned a common system generated COLOCATE USING name.

The Advisor stored procedure accepts an optional caller specified GroupTimeLimit which represents a maximum time for moving all of the tables in a given group. The grouping algorithm will only use this parameter to flag those groups whose combined time exceeds this limit. A suitable warning message will be included in the row stored in TDMaps.ActionsTbl.Description for such groups. Any corrective action that involves breaking up and reducing the size of recommended groups will be left to the user who has the option of overriding all recommended groups prior to their submission to Mover stored procedures. No automated action is attempted because the algorithm is inherently designed to recommend the smallest groups possible while still accomplishing its primary goal.

Example

Assume the query level table sets shown in FIG. 20G have been generated by the recursive query logic described in the preceding section along with aggregated workload level frequencies and average per-query join step costs. FIG. 20G shows the weighted formula calculation for each group along with the associated Group Rank. FIG. 20H shows the Groups after removing duplicates which in turn are the final recommended groups.

Sparse Maps (Spare Database Tables)

In a large database systems (e.g., data warehouses) database tables can be stored on many different processors (e.g., AMPs). For efficiency, the data in a database table can be evenly distributed among all the processors. In this way, each processor can have about the same work to do. For tables with a small amount of data many processors may have no work to do.

It will be appreciated, the number of processors that store data can to improve efficiency, in accordance with one aspect. In one embodiment, a sparse map can be provided for sparse database tables (or tables). For example, a sparse map can be created with a syntax:

CREATE MAP FourAMPMap
FROM TD_Map1
AMPCOUNT=4;
The map can be used like other maps in a CREATE TABLE syntax:
CREATE TABLE Tab1, MAP=FourAMPMap (C1_INT, C2_INT)
The database assigns 4 processors (AMPs) to store the table on from all of the processors available in TD_Map1. No work is required by the administrator to choose which four processors to store the table on. The processors are chosen in a manner to distribute the work across all of the AMPs and nodes. First, a processor list based on TD_Map1 is built to distribute the processors across the nodes in the same relative manner. For example, suppose map TD_Map1 contains 100 AMPs in 4 nodes with 25 AMPs per node. The first node has AMPs 0 through 99, the second 100 through 199, etc. The processor list is built as follows: 0, 25, 50, 75, 1, 26, 51, 76, 2, 27, 52, 77, 3 . . . 99. The pattern for the list of processors is based on the number nodes. Two items are needed to choose the actual AMPs to store the data one: a starting index and a number of AMPs. For example, suppose the starting index is 2 and the number of AMPs is 4, then the AMPs chosen are 50, 75, 1, and 26.

If more than one small table are joined together using the same primary index in the same sparse map, then the following mechanism is used to choose the same four processors from all of TD_Map1. The two items needed to choose the processors are the starting index and number of AMPs. The number of AMPs is the same since both tables are in the same sparse map. So, the only thing needed is the same starting index. The starting index is chosen by hashing on a string using the hash map of the parent map, TD_Map1. This gives a starting index between 0 and 99. The string is formed by combining two collocation names. These names are optionally specified in the CREATE TABLE syntax:
CREATE TABLE Tab1, MAP=FourAMPMap
COLOCATE USING Name1.Name2
(C1 INT, C2 INT);
If the COLOCATE USING clause is not given, then Name1 defaults to the database name for Tab1 and Name2 defaults to Tab1.

It should be noted that tables in sparse maps can also support fallback protection. This can, for example, be done by simply using one of the AMPs in the fallback cluster for each AMP the table is defined to have.

Choosing Tables to Move to Newly Available Processors

In a large database systems (e.g., data warehouses) database tables can be stored on many different processors (e.g., AMPs). For efficiency, the data in a database table can be evenly distributed among all the processors. In this way, each processor can have about the same work to do. After new processing and storage capacity is added portions of tables should be moved to the new processors. But, not all tables need to be moved at the same time. And, some tables should be moved together. It will be appreciated that tables can be selected to be moved together in an effect manner, in accordance with one A good first approximation of which tables to move can be based on the size of the table (table size). That is, the larger the table the more benefit it gets from the extra processing. Besides ordering the tables based on size, some tables should be moved together. Tables that should be moved together can be tables which are joined together and have the rows they need to join already on the same processors: in-place joins. To determine which tables have in-place join relationships, the type of join is logged in the query logging tables. A recursive query is used to analyze the logged query data to generate input source paths.

For example a logged query is a 4-way join where each binary join step operates on in-place input. It's set of in-place join tables consist of: {T1,T2}, {T3,T4}, {T1,T2,T3,T4}, and {T1,T2,T3,T3,T5}. Although some are subsets of larger sets, each is separately recorded because their aggregated frequencies across the workload may differ. For example, there may be many queries with an in-place binary join involving {T1,T2} but only a few that have the full 4-way inplace join involving all 5 tables.
1.1 RET T1→Spool_1 (Local)
1.2 RET T2→Spool_2 (Local)
2. Spool_1 JIN* Spool_2→Spool_3 (Local)
3. T3 JIN* T4→Spool_4 (Local)
4. Spool_3 JIN* Spool_4→Spool_5 (Local)
5. Spool_5 JIN* T5→Spool_6 (Response final)
The query level results are then aggregated to form the set of distinct table sets along with their SUM frequency and AVG per query step costs There is a tradeoff in the average size of formed groups (# table members). Larger groups have the advantage of ensuring that all related joining tables are processed together in a given move operation. On the other hand, large groups make it more difficult to schedule and finish an entire group within a specified time window. In general, performing a body of work in smaller chunks provides the best opportunity to maximize the total amount of work done while still adhering to time limits. For these reasons, the grouping technique can favor smaller groups.

The following are the major steps in forming and prioritizing groups:
(1)—Form the initial groups from the query-level in-place join paths
(2)—Rank the groups by workload frequency and average join step cost
(3)—Traverse ranked list from top to bottom and remove duplicate table entries
(4)—(Optionally) Identify and report those groups whose estimated times exceed the caller specified group time limit (informational purposes only).

A recursive query can be applied to DBQL data to determine sets of two or more tables involved in consecutive inplace join steps. It then aggregated these results to form distinct sets along with frequencies and average per query cost. These table sets form the initial set of candidate groups for our algorithm as they represent the smallest groups that are still capable of preserving a series of consecutive inplace join steps for individual queries. The size of these groups is assumed to represent the "sweet spot" in the table size tradeoff discussed earlier. Because these table sets represent in-place join paths from different queries across the workload, the same table will often appear in multiple groups. For example, T1 may be joined with T2 in certain queries whereas it's joined with T3 (and not T2) in other queries. Because each table should only be moved once, the union of the final sets cannot have duplicates. In order to determine which set a particular table should be assigned to, in (2) we rank the candidate sets by the following weighted formula. Each table will then be assigned to the highest ranking group that it is a member of:

$$GroupRank=RANK(\ )OVER(ORDER\ BY(WF*JoinFrequency+WCJoinCostMagnitude)DESC).$$

The intent of the ranking formula is to favor those table sets with high frequencies and high join costs. In-place join steps are inherently an efficient operation relative to a non-inplace operation on the same data. Hence, an expensive in-place operation would be even more costly if an uncoordinated movement of its inputs to different maps were to take place. Put another way, the most expensive in-place join steps are the most important ones to try and preserve. In the ranking formula above, JoinCostMagnitude is the number of digits in the average per-query cost for performing inplace join steps on the given table set. The cost will be represented in seconds and the corresponding number of digits should normally range from 1 to 6 (999999=278 hours). Factors WF and WC in the above formula are configurable weighting factors whose default values are 1.0.

(3) then traverses the ranked groups from highest to lowest ranked and removes any tables in the current group that have already been assigned to a previously traversed group. The ranking of groups that have tables removed is not changed in order to preserve the importance of the joining relationship with the table that was reassigned to a higher ranked group. Under this paradigm, a lower ranked group may lose one of its member tables but it will retain its relative ordering among other groups.

some tables may not be involved in any logged in-place join operations and thus their frequency and step cost will be zero. Such sets are referred to as "loners" and will be ranked lower than all other sets that have inplace joins. Among loners, those with a larger estimated table size will be ranked higher under the assumption that larger tables will benefit more from moving to a large map (system expansion). It is also possible for loners to exist after duplicates are removed during (3) although as note above such reduced sets retain their original ranking.

Mover Time Limit

In a large database systems (e.g., data warehouses) database tables can be stored on many different processors (e.g., AMPs). For efficiency, the data in a database table can be evenly distributed among all the processors. In this way, each processor can have about the same work to do. After new processing and storage capacity is added portions of tables should be moved to the new processors. Not all tables need to be moved at the same time but some tables should be moved together. It will be appreciated that it can be determined which tables should be moved in a given maintenance window, in accordance with one aspect.

Assuming that the tables have been already grouped together and ordered by their importance. The input list can be taken as input to move as many groups of tables as possible in a given maintenance window. An important factor cab be how long it will take to move a group of tables.

The time to move a group of tables can, for example, be determined by the following:

$$Time = NumOfBytes * BytesPerSecondEstimate * FixedAdjustment * DynamicAdjustment$$

where NumOfBytes is the number of bytes in the table, and BytesPerSecondEstimate is an estimate of how long it takes to move a table. This estimate is calculated by comparing an explain of the move with an experiment for a typical table. The longer estimate can be chosen. FixedAdjustment can be an optionally site-specific adjustment. DynamicAdjustment can be an adjustment that considers how long a previous move took in the maintenance window compared with its estimate. This adjustment tries to compensate for system load.

At the start of the maintenance window the ordered input list of groups of tables is checked. Using the above formula the first group of tables that fits in the maintenance window is deleted from the ordered list and inserted into a queue table. Then, however many sessions the site wishes, removes the table names from the queue table and modifies the table to use the new processors. When all of the tables in the group have been moved, the next group of tables that fit in the remaining time is deleted from the ordered list and inserted into a queue table. This can continue until no more groups of tables fit in the remaining time.

Generally, various aspects, features, embodiments or implementations of the invention described above can be used alone or in various combinations. Furthermore, implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CDROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, tactile or near-tactile input.

Implementations of the subject matter described in this specification can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The various aspects, features, embodiments or implementations of the invention described above can be used alone or in various combinations. The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A computer-implemented method of reassigning data portions assigned to a first map to a second map for processing by multiple processing units of a database system configured to process data stored in a database, wherein the computer-implemented method is implemented by one or more physical processors configured to access at least computer executable code stored in a non-transitory computer storage medium, and wherein the computer-implemented method comprises:
   selecting a set of the distinct data portions assigned to the first map for assignment to the second map as selected data portions, wherein the first map assigns each one of the distinct data portions to one or more multiple processing units of the database system for processing in accordance with one or more distributions schemes; and
   determining multiple reassigning groups for the selected data portions, wherein at least one the reassigning groups identifies two or more of the selected data portions from the first map for reassigning together as a group to the second map.

2. The computer-implemented method of claim 1, wherein the selecting selects the distinct data portions assigned to the first map at least partly based data pertaining to execution of one or more database query plans that have used the first map and/or second map.

3. The computer-implemented method of claim 1, wherein the determining of the at least one reassigning group for the selected data portions is determined at least partly based on the relationship between two or more of the selected data portions.

4. The computer-implemented method of claim 1, wherein the determining of at least one reassigning group for the selected data portions is determined at least partly based on one or more of the following:

number of times two or more of the selected data portions have been involved in one or more database operations needed to execute one or more database query plans that have used the two or more of the selected data portions; and cost associated with performing one or more data operations performed in relation to the two or more of the selected data portions in order to execute one or more database query plans that have used the two or more of the selected data portions.

5. The computer-implemented method of claim 4, wherein the determining of at least one reassigning group for the selected data portions is determined at least partly based on determining frequencies and aggregated join costs associated with the performing of the one or more data operations performed in relation to the two or more of the selected data portions.

6. The computer-implemented method of claim 5, wherein each one of the distinct data portions includes a database table of the database, and wherein the computer implemented method further:

recursively analyzing logged query plan operations to identify inplace join paths associated with the two or more of the selected database tables; and assigning database tables to groups to perverse the dominant query level join paths.

7. The computer-implemented method of claim 5, wherein he second map is a relatively newer map than the first map.

8. The computer-implemented method of claim 1, wherein the multiple reassigning groups include first and a second reassigning groups to be reassigned to the second map, and wherein each one of the first and a second groups identifies one or more of the selected data portions; and wherein the computer-implemented method further comprises:

determining a first time or a first time period for reassigning the one or more data portions of the first group from the first map to the second map.

9. The computer-implemented method of claim 8, wherein the determining of the first time or the first time period is made at least partly based on more or more of the following: the size of the data portions of the first group, the time needed to reassign the first group, and a determined workload of the database system.

10. The computer-implemented method of claim 9, wherein the computer-implemented method further comprises:

determining a second time or second time period for reassigning the one or more data portions of the second group from the first map to the second map.

11. The computer-implemented method of claim 9, wherein the computer-implemented method further comprises:

facilitating reassignment of the first group at the first time or during the first time period.

12. The computer-implemented method of claim 1, wherein the computer-implemented method further comprises:

monitoring database query execution plans.

13. A device comprising:

one or more physical processors configured to:

execute computer executable code stored in a non-transitory computer storage medium; select a set of the distinct data portions assigned to a first map for assignment to a second map as selected data portions, wherein the first map assigns each one of the distinct data portions to one or more multiple processing units of a database system for processing in accordance with one or more distributions schemes; and determine multiple reassigning groups for the selected data portions, wherein at least one the reassigning groups identifies two or more of the selected data portions from the first map for reassigning together as a group to the second map.

14. A non-transitory computer readable medium storing at least computer readable executable code that when executed:

selects a set of the distinct data portions assigned to a first map for assignment to a second map as selected data portions, wherein the first map assigns each one of the distinct data portions to one or more multiple processing units of a database system for processing in accordance with one or more distributions schemes; and determines multiple reassigning groups for the selected data portions, wherein at least one the reassigning groups identifies two or more of the selected data portions from the first map for reassigning together as a group to the second map.

\* \* \* \* \*